United States Patent
Aizawa

(10) Patent No.: US 11,967,889 B2
(45) Date of Patent: Apr. 23, 2024

(54) DC-DC CONVERTER HAVING CHARGE PUMP CIRCUIT FOR DETERMINING OPERATION TIMING

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kiyoshi Aizawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 215 days.

(21) Appl. No.: 17/753,243

(22) PCT Filed: Aug. 7, 2020

(86) PCT No.: PCT/JP2020/030293
§ 371 (c)(1),
(2) Date: Feb. 24, 2022

(87) PCT Pub. No.: WO2021/039356
PCT Pub. Date: Mar. 4, 2021

(65) Prior Publication Data
US 2022/0321011 A1 Oct. 6, 2022

(30) Foreign Application Priority Data
Aug. 28, 2019 (JP) .................................. 2019-155284

(51) Int. Cl.
*H02M 1/08* (2006.01)
*H02M 1/00* (2006.01)
(Continued)

(52) U.S. Cl.
CPC ............ *H02M 1/0006* (2021.05); *H02M 1/08* (2013.01); *H02M 3/07* (2013.01); *H02M 3/1582* (2013.01)

(58) Field of Classification Search
CPC ....... H02M 3/158; H02M 3/1582; H02M 3/07; H02M 1/08; H02M 1/088; H02M 1/0006; H02M 1/0003
See application file for complete search history.

(56) References Cited

U.S. PATENT DOCUMENTS 6,650,100 B1 * 11/2003 Kohout ............... H02M 3/1582
323/282
11,323,031 B2 * 5/2022 Cattani ............... H02M 3/1582
(Continued)

FOREIGN PATENT DOCUMENTS

JP 2008-029085 A 2/2008
JP 2014-011841 A 1/2014
(Continued)

OTHER PUBLICATIONS

International Search Report, Application No. PCT/JP2020/030293, dated Sep. 8, 2020. ISA/Japan Patent Office.

*Primary Examiner* — Kyle J Moody
*Assistant Examiner* — Jye-June Lee
(74) *Attorney, Agent, or Firm* — Honigman LLP

(57) ABSTRACT

A bootstrap circuit unit of a DC-DC converter applies, to a drive unit, a voltage that is higher than that at a first connection point between switching elements in a first conversion operation, and applies, to the drive unit, a voltage that is higher than that at a second connection point between switching elements in a second conversion operation. A charge-pump circuit unit steps up an input voltage and applies the resulting voltage to the drive unit. The drive unit sets the voltage of a first drive signal and a second drive signal according to a voltage applied by the bootstrap circuit
(Continued)

unit or a voltage applied by the charge-pump circuit unit. The charge-pump circuit unit determines the operation timing at which the charge-pump circuit unit is to apply the output voltage, based on the first and second voltage, and the first and second power supply unit charging signals.

7 Claims, 6 Drawing Sheets

(51) Int. Cl.
*H02M 3/07* (2006.01)
*H02M 3/158* (2006.01)

(56) References Cited

U.S. PATENT DOCUMENTS

| | | | |
|---|---|---|---|
| 11,722,056 B2* | 8/2023 | Yelamos Ruiz | H02M 1/0029 363/13 |
| 2004/0085052 A1 | 5/2004 | Itabashi et al. | |
| 2009/0027925 A1 | 1/2009 | Kanouda et al. | |
| 2014/0217959 A1* | 8/2014 | Chen | H02M 3/1582 323/311 |
| 2014/0252950 A1 | 9/2014 | Kikuchi et al. | |
| 2015/0357917 A1 | 12/2015 | Okamatsu et al. | |
| 2016/0065072 A1* | 3/2016 | Xiu | H02M 1/08 323/271 |
| 2017/0033677 A1* | 2/2017 | Wu | H02M 3/07 |
| 2018/0109179 A1* | 4/2018 | Zhao | H02M 3/1582 |
| 2019/0238051 A1* | 8/2019 | Li | H02M 3/1582 |
| 2019/0326817 A1* | 10/2019 | Zhang | H02M 3/1582 |
| 2021/0083572 A1* | 3/2021 | Yen | H02M 3/07 |
| 2021/0083573 A1* | 3/2021 | Yen | H02M 3/07 |
| 2021/0391795 A1* | 12/2021 | Gandhi | H02M 3/1582 |
| 2022/0085718 A1* | 3/2022 | Singh | H02M 3/1582 |

FOREIGN PATENT DOCUMENTS

| | | |
|---|---|---|
| JP | 2016-063648 A | 4/2016 |
| JP | 2019-135887 A | 8/2019 |

\* cited by examiner

DC-DC CONVERTER HAVING CHARGE PUMP CIRCUIT FOR DETERMINING OPERATION TIMING

CROSS-REFERENCE TO RELATED APPLICATIONS

This application is the U.S. national stage of PCT/JP2020/030293 filed on Aug. 7, 2020, which claims priority of Japanese Patent Application No. JP 2019-155284 filed on Aug. 28, 2019, the contents of which are incorporated herein.

TECHNICAL FIELD

The present disclosure relates to a DC-DC converter.

BACKGROUND

If an N-channel MOSFET is used as a switching element and driven on the high side, a gate voltage needs to be higher than a source voltage. In order to realize this, bootstrap circuits have conventionally been used. The magnitude of the voltage that is supplied from a bootstrap circuit is determined by the voltage for charging a capacitor in the bootstrap circuit.

JP 2014-11841A discloses a configuration in which a bootstrap circuit and a charge-pump circuit are used in combination. Specifically, a control method is adopted in which an input voltage is monitored and a charge pump is operated only when the input voltage is lower than a predetermined threshold. However, this control method cannot be directly applied to a converter that performs a bidirectional conversion operation. A bidirectional converter needs to consider not only the input voltage but also other factors in order to determine the timing at which the charge-pump circuit is to be operated.

In view of this, an object of this disclosure is to provide a DC-DC converter that includes a charge-pump circuit whose operation timing is appropriate, and that is configured to perform a bidirectional step-up/down operation.

SUMMARY

A DC-DC converter according to this disclosure includes: a voltage conversion unit configured to perform bidirectional voltage conversion between a first conductive path and a second conductive path; a control unit configured to output a control signal for controlling the voltage conversion unit; a drive unit configured to output a drive signal that corresponds to the control signal that is output from the control unit; a first voltage detection unit configured to detect a first voltage that is applied to the first conductive path; and a second voltage detection unit configured to detect a second voltage that is applied to the second conductive path; in which the voltage conversion unit is configured to perform a first conversion operation, which is at least either an operation for stepping down a voltage that is applied to the first conductive path and applying the resulting voltage to the second conductive path or an operation for stepping up a voltage that is applied to the second conductive path and applying the resulting voltage to the first conductive path, and to perform a second conversion operation, which is at least either an operation for stepping up a voltage that is applied to the first conductive path and applying the resulting voltage to the second conductive path or an operation for stepping down a voltage that is applied to the second conductive path and applying the resulting voltage to the first conductive path, the control unit is configured to output a first control signal for performing the first conversion operation and a second control signal for performing the second conversion operation. the drive unit includes a first drive unit configured to output a first drive signal that corresponds to the first control signal to the voltage conversion unit when the first control signal is output from the control unit, and a second drive unit configured to output a second drive signal that corresponds to the second control signal to the voltage conversion unit when the second control signal is output from the control unit, the voltage conversion unit includes a first switching unit that includes a first high-side element including a switch and a first low-side element including a switch or a diode and that is supplied with the first drive signal, and a second switching unit that includes a second high-side element including a switch and a second low-side element including a switch or a diode and that is supplied with the second drive signal, the voltage conversion unit is configured to perform the first conversion operation when the first drive signal is supplied to the first switching unit, the voltage conversion unit is configured to perform the second conversion operation when the second drive signal is supplied to the second switching unit, the DC-DC converter further including: a bootstrap circuit unit configured to apply, to the drive unit, a voltage that is higher than a voltage at a first connection point between the first high-side element and the first low-side element in the first conversion operation, and apply, to the drive unit, a voltage that is higher than a voltage at a second connection point between the second high-side element and the second low-side element in the second conversion operation; and a charge-pump circuit unit configured to step up an input voltage and apply an output voltage that is higher than the input voltage to the drive unit, in which the drive unit is configured to output the first drive signal and the second drive signal that include a voltage signal that corresponds to a voltage that is applied by the bootstrap circuit unit or a voltage that is applied by the charge-pump circuit unit, and the charge-pump circuit unit is configured to determine the operation timing at which the charge-pump circuit unit is to apply the output voltage, based on the first voltage, the second voltage, and the state of the first conversion operation or the second conversion operation.

Advantageous Effects of Invention

According to this disclosure, it is possible to realize a DC-DC converter that includes a charge-pump circuit whose operation timing is appropriate, and that is configured to perform a bidirectional step-up operation.

DETAILED DESCRIPTION OF PREFERRED EMBODIMENTS

Figure 1:
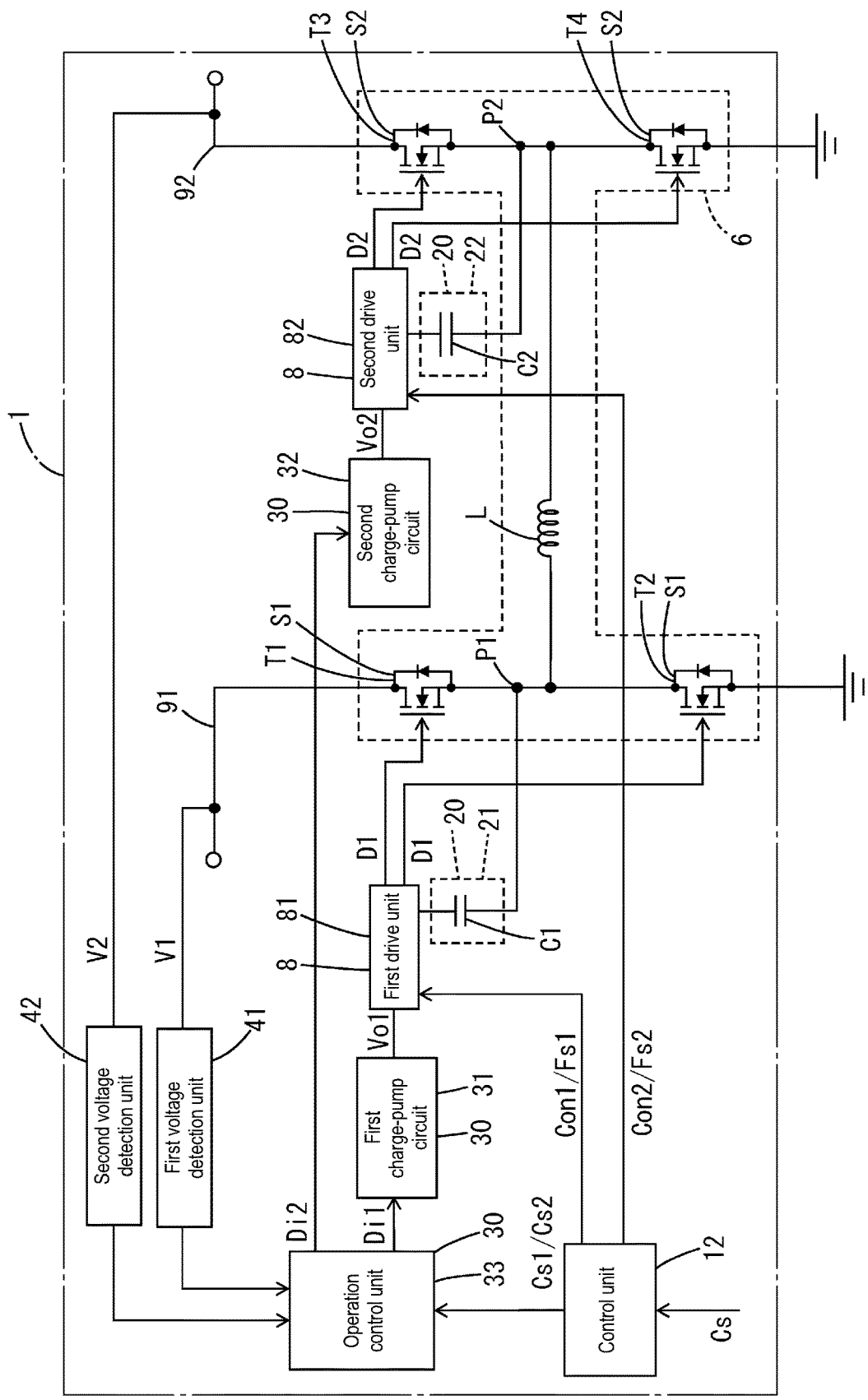
FIG. 1 is a circuit diagram showing a DC-DC converter according to Embodiment 1.

First, embodiments of this disclosure will be listed and described below.

A DC-DC converter according to this disclosure includes a voltage conversion unit, a control unit, a drive unit, a first voltage detection unit, and a second voltage detection unit.

The voltage conversion unit performs bidirectional voltage conversion between a first conductive path and a second conductive path. The control unit outputs a control signal for controlling the voltage conversion unit. The drive unit outputs a drive signal that corresponds to the control signal that is output from the control unit. The first voltage detection unit detects a first voltage that is applied to the first conductive path. The second voltage detection unit detects a second voltage that is applied to the second conductive path. The voltage conversion unit performs a first conversion operation and a second conversion operation. In the first conversion operation, at least either an operation in which a voltage that is applied to the first conductive path is stepped down and a voltage is applied to the second conductive path or an operation in which a voltage that is applied to the second conductive path is stepped up and a voltage is applied to the first conductive path is performed. In the second conversion operation, at least either an operation in which a voltage that is applied to the first conductive path is stepped up and a voltage is applied to the second conductive path or an operation in which a voltage that is applied to the second conductive path is stepped down and a voltage is applied to the first conductive path is performed. The control unit outputs a first control signal for performing the first conversion operation and a second control signal for performing the second conversion operation.

The drive unit includes a first drive unit and a second drive unit. When the first control signal is output from the control unit, the first drive unit outputs the first drive signal that corresponds to the first control signal to the voltage conversion unit. When the second control signal is output from the control unit, the second drive unit outputs the second drive signal that corresponds to the second control signal to the voltage conversion unit. The voltage conversion unit includes a first switching unit and a second switching unit. The first switching unit includes a first high-side element including a switch and a first low-side element including a switch or a diode and is supplied with the first drive signal. The second switching unit includes a second high-side element including a switch and a second low-side element including a switch or a diode and is supplied with the second drive signal. When the first drive signal is provided to the first switching unit, the voltage conversion unit performs the first conversion operation. The voltage conversion unit is configured to perform the second conversion operation when the second switching unit is supplied with the second drive signal.

Furthermore, the DC-DC converter according to this disclosure includes a bootstrap circuit unit and a charge-pump circuit unit. The bootstrap circuit unit applies a voltage that is higher than that at a first connection point between the first high-side element and the first low-side element to the drive unit in the first conversion operation. The bootstrap circuit unit applies a voltage that is higher than that at a second connection point between the second high-side element and the second low-side element to the drive unit in the second conversion operation. The charge-pump circuit unit steps up an input voltage and applies an output voltage that is higher than the input voltage to the drive unit. The drive unit outputs voltages of the first drive signal and the second drive signal that include voltage signals that correspond to a voltage that is applied by the bootstrap circuit unit or a voltage that is applied by the charge-pump circuit unit. The charge-pump circuit unit determines the operation timing at which the charge-pump circuit unit is to apply the output voltage, based on the first voltage, the second voltage, and the state of the first conversion operation or the second conversion operation.

With this DC-DC converter, a voltage that is higher than a voltage at the first connection point between the first high-side element and the first low-side element or a voltage at the second connection point between the second high-side element and the second low-side element may be applied to the drive unit by the bootstrap circuit unit in the first conversion operation or the second conversion operation. Furthermore, the charge-pump circuit unit can determine the operation timing at which the charge-pump circuit unit is to apply the output voltage, based on the first voltage and the second voltage. Therefore, with a configuration in which bidirectional voltage conversion can be performed, even if the bootstrap circuit cannot apply an appropriate voltage at the operation timing determined by the charge-pump circuit unit, a voltage that is higher than the appropriate voltage can be applied by the charge-pump circuit unit. Furthermore, there is no need to keep the charge-pump circuit unit operating all the time, and it is possible to operate the charge-pump circuit unit at the required timing in which the first voltage, the second voltage, and the state of the first conversion operation or the second conversion operation are reflected, and thus it is possible to reduce power consumption.

If at least the difference between the first voltage and the second voltage is less than a first threshold in a state where the first conversion operation is being performed, the charge-pump circuit unit of the DC-DC converter according to this disclosure may apply an output voltage to the first drive unit.

With such a configuration, when the difference between the first voltage and the second voltage is less than the first threshold in the first conversion operation and there is a growing concern that an appropriate voltage may not be applied by the bootstrap circuit unit, this DC-DC converter may operate the charge-pump circuit unit and apply a voltage to the drive unit. Also, regardless of the magnitude of the absolute value of the first voltage or the second voltage, the operation of the charge-pump circuit unit is switched based on the relative relationship between the first voltage and the second voltage. Therefore, the voltage that is output to the first conductive path or the second conductive path is not limited to having a specific value, and an output voltage of a desired magnitude can be used.

The charge-pump circuit unit of the DC-DC converter according to this disclosure may apply an output voltage to the second drive unit if at least the difference between the first voltage and the second voltage is less than a second threshold in a state where the second conversion operation is being performed.

With such a configuration, when the difference between the first voltage and the second voltage is less than the second threshold in the second conversion operation and there is a growing concern that an appropriate voltage may not be applied by the bootstrap circuit unit, this DC-DC converter may operate the charge-pump circuit unit and apply a voltage to the drive unit. Also, regardless of the magnitude of the absolute value of the first voltage or the second voltage, the operation of the charge-pump circuit unit is switched based on the relative relationship between the first voltage and the second voltage. Therefore, the voltage that is output to the first conductive path or the second conductive path is not limited to having a specific value, and an output voltage of a desired magnitude can be used.

If the first conversion operation is being performed so as to step down the voltage that is applied to the first conductive path and apply a voltage to the second conductive path, or if the second conversion operation is being performed so as to step down a voltage that is applied to the second conductive path and apply a voltage to the first conductive path, the charge-pump circuit unit of the DC-DC converter according to this disclosure may apply the output voltage to the first drive unit when the second voltage is larger than the first voltage, and may apply the output voltage to the second drive unit when the first voltage is larger than the second voltage.

With such a configuration, when a step-down operation is performed between the first conductive path and the second conductive path and the first voltage is larger than the second voltage, the second switching unit does not perform a switching operation, and thus the bootstrap circuit unit cannot apply an appropriate voltage to the second drive unit. When there is a growing concern that the second high-side element cannot be reliably switched ON, this DC-DC converter can reliably switch the second high-side element ON using the charge-pump circuit unit. Furthermore, when the second voltage is larger than the first voltage, the first switching unit does not perform a switching operation, and thus the bootstrap circuit unit cannot apply an appropriate voltage to the first drive unit. When there is a growing concern that the first high-side element cannot be reliably switched ON, because the first high-side element can be reliably switched ON by the charge-pump circuit unit. As a result, this DC-DC converter can favorably exchange power between the first conductive path and the second conductive path.

If the first conversion operation is being performed so as to step up the voltage that is applied to the second conductive path and apply a voltage to the first conductive path, or if the second conversion operation is being performed so as to step up a voltage that is applied to the first conductive path and apply a voltage to the second conductive path, the charge-pump circuit unit of the DC-DC converter according to this disclosure may apply the output voltage to the second drive unit when the first voltage is larger than the second voltage, and may apply the output voltage to the first drive unit when the second voltage is larger than the first voltage.

With such a configuration, when a step-up operation is performed between the first conductive path and the second conductive path and the first voltage is larger than the second voltage, the second switching unit does not perform a switching operation, and thus the bootstrap circuit unit cannot apply an appropriate voltage to the second drive unit. When there is a growing concern that the second high-side element cannot be reliably switched ON, this DC-DC converter can reliably switch the second high-side element ON using the charge-pump circuit unit. Furthermore, when the second voltage is larger than the first voltage, the first switching unit does not perform a switching operation, and thus the bootstrap circuit unit cannot apply an appropriate voltage to the first drive unit. When there is a growing concern that the first high-side element cannot be reliably switched ON, the first high-side element can be reliably switched ON by the charge-pump circuit unit. As a result, this DC-DC converter can favorably exchange power between the first conductive path and the second conductive path.

The charge-pump circuit unit of the DC-DC converter according to this disclosure includes a first charge-pump circuit, a second charge-pump circuit, and an operation control unit. The first charge-pump circuit applies a first output voltage to the first drive unit. The second charge-pump circuit applies a second output voltage to the second drive unit. The operation control unit controls the operations of the first charge-pump circuit and the second charge-pump circuit. The operation control unit may determine the timing at which the first charge-pump circuit is to apply the first output voltage and the timing at which the second charge-pump circuit is to apply the second output voltage, based on the first voltage, the second voltage, and the state of the first conversion operation or the second conversion operation.

According to this configuration, the DC-DC converter can apply voltages to the first drive unit and the second drive unit individually, and thus, it is possible to individually drive the first switching unit and the second switching unit, and to more efficiently operate the voltage conversion unit.

The charge-pump circuit unit of the DC-DC converter according to this disclosure includes a charge-pump circuit and an operation control unit. The charge-pump circuit performs a first operation for applying the first output voltage to the first drive unit and a second operation for applying the second output voltage to the second drive unit. The operation control unit controls the first operation and the second operation of the charge-pump circuit. The operation control unit may also determine the timing of the first operation and the timing of the second operation based on the first voltage, the second voltage, and the state of the first conversion operation or the second conversion operation.

According to this configuration, the charge-pump circuit can switch at least one of the first operation and the second operation using the operation control unit. Thus, the DC-DC converter according to this disclosure can reduce the number of members, compared to a case where two charge-pump circuits are provided corresponding to the first drive unit and the second drive unit.

Embodiment 1

Overview of DC-DC Converter

A DC-DC converter 1 shown in FIG. 1 is configured as an in-vehicle step-up/down DC-DC converter, for example, and is configured to step up or down a DC voltage applied to one of a first conductive path 91 and a second conductive path 92, and outputs the resulting voltage to the other conductive path.

The DC-DC converter 1 includes the first conductive path 91 and the second conductive path 92, which are power lines. The first conductive path 91 is electrically connected to a high-potential terminal of a first power supply unit (not shown), and is electrically continuous with this high-potential terminal. A configuration is adopted in which a predetermined DC voltage is applied from the first power supply unit to the first conductive path 91. The second conductive path 92 is electrically connected to a high-potential terminal of a second power supply unit (not shown), and is electrically continuous with this high-potential terminal. A configuration is adopted in which a predetermined DC voltage is applied from the second power supply unit to the second conductive path 92.

Each of the first power supply unit and the second power supply unit is constituted by a known power storage means, such as a lead storage battery, a lithium-ion battery, an electric double-layer capacitor, a lithium-ion capacitor, or another power storage unit. The voltage output from the first power supply unit and the voltage output from the second power supply unit are not particularly limited to having specific values, and these output voltages are preferably equal to each other. Low-potential terminals of the first power supply unit and the second power supply unit are electrically connected to a grounding unit (not shown), and kept at a predetermined ground potential (0 V).

The DC-DC converter 1 includes a voltage conversion unit 6, a first voltage detection unit 41, a second voltage detection unit 42, a control unit 12, a drive unit 8, a bootstrap circuit unit 20, and a charge-pump circuit unit 30.

The voltage conversion unit 6 functions to step up or down a voltage input thereto through on/off operations of switching elements T1, T2, T3, and T4, and outputting the resulting voltage. The voltage conversion unit 6 is provided between the first conductive path 91 and the second conductive path 92. The voltage conversion unit 6 may perform a first conversion operation and a second conversion operation. The first conversion operation is at least either the operation of stepping down a voltage that is applied to the first conductive path 91 and applying the resulting voltage to the second conductive path 92 or the operation of stepping up a voltage that is applied to the second conductive path 92 and applying the resulting voltage to the first conductive path 91. The second conversion operation is at least either the operation of stepping up a voltage that is applied to the first conductive path 91 and applying the resulting voltage to the second conductive path 92 or the operation of stepping down a voltage that is applied to the second conductive path 92 and applying the resulting voltage to the first conductive path 91.

The voltage conversion unit 6 includes the switching elements T1, T2, T3, and T4 that are arranged in an H-bridge configuration and an inductor L, and functions as a DC-DC converter that executes so-called bidirectional step-up/down. Each of the switching elements T1, T2, T3, and T4 is configured as an N-channel MOSFET. The switching element T1 is a first high-side element. The switching element T2 is a first low-side element. The switching element T3 is a second high-side element. The switching element T4 is a second low-side element. The switching elements T1 and T2 constitute a first switching unit S1. The switching elements T3 and T4 constitute a second switching unit S2. The inductor L is configured as a known coil having a predetermined inductance.

With the voltage conversion unit 6, the first conductive path 91 is electrically connected to the drain of the switching element T1, and the drain of the switching element T2 and one end of the inductor L are electrically connected to the source of the switching element T1. The second conductive path 92 is electrically connected to the drain of the switching element T3, and the drain of the switching element T4 and the other end of the inductor L are electrically connected to the source of the switching element T3. The sources of the switching elements T2 and T4 are electrically connected to the ground. A first drive signal D1, a second drive signal D2, and the like that will be described later and output from the drive unit 8 are input to the gates of the switching elements T1, T2, T3, and T4.

Each of the first voltage detection unit 41 and the second voltage detection unit 42 is configured as a known voltage detection circuit. The first voltage detection unit 41 inputs, to an operation control unit 33 of the charge-pump circuit unit 30, a value indicating the first voltage V1 of the first conductive path 91 (e.g., the voltage value of the first conductive path 91 or a value obtained by dividing the voltage value of the first conductive path 91 using a voltage-dividing circuit or the like) as a detected value. The second voltage detection unit 42 inputs, to the operation control unit 33, a value indicating the second voltage V2 of the second conductive path 92 (e.g., the voltage value of the second conductive path 92 or a value obtained by dividing the voltage value of the second conductive path 92 using a voltage-dividing circuit or the like) as a detected value. The operation control unit 33 can specify the voltage value of the first conductive path 91 based on the value received from the first voltage detection unit 41 and can specify the voltage value of the second conductive path 92 based on the value received from the second voltage detection unit 42.

The first voltage detection unit 41 is configured to be able to input a value indicating the first voltage V1 of the first conductive path 91 to the control unit 12 as a detected value (not shown). The second voltage detection unit 42 is configured to be able to input a value indicating the second voltage V2 of the second conductive path 92 to the control unit 12 as a detected value (not shown).

The control unit 12 is configured as a microcomputer, for example. The control unit 12 performs feedback control based on the value indicating the first voltage V1 and the value indicating the second voltage V2 that are received from the first voltage detection unit 41 and the second voltage detection unit 42, and a target voltage value, using a known method, and the control unit 12 sets the duty cycle of a PWM signal to be provided to the voltage conversion unit 6. The control unit 12 then outputs a set first control signal Con1 and a set second control signal Con2 to the drive unit 8. The target voltage value may be a value set by the control unit 12, or may also be a value designated by an external apparatus, such as an external ECU. The target voltage value can be changed to a desired value. As a result, the magnitude of the voltage that is output to the first conductive path 91 or the second conductive path 92 can be changed to a desired value. A configuration is adopted in which the control unit 12 receives a charging selection signal Cs, which indicates which of the first power supply unit and the second power supply unit is to be charged, from an external ECU or the like. If the charging selection signal Cs indicates that the first power supply unit is to be charged, for example, the control unit 12 transmits, to the operation control unit 33 of the charge-pump circuit unit 30, a first power supply unit charging signal Cs1 for stepping up or down the voltage from the second conductive path 92 toward the first conductive path 91 and charging the first power supply unit. If the charging selection signal Cs indicates that the second power supply unit is to be charged, for example, the control unit 12 transmits, to the operation control unit 33 of the charge-pump circuit unit 30, a second power supply unit charging signal Cs2 for stepping up or down the voltage from the first conductive path 91 toward the second conductive path 92 and charging the second power supply unit.

The drive unit 8 includes a first drive unit 81 and a second drive unit 82. If the first control signal Con1, which is a control signal, is output from the control unit 12, the first drive unit 81 outputs the first drive signal D1 that corresponds to the first control signal Con1 to the first switching unit S1 constituted by the switching elements T1 and T2. As a result, the first switching unit S1 starts synchronous rectification control. If the second control signal Con2, which is a control signal, is output from the control unit 12, the second drive unit 82 outputs the second drive signal D2 that corresponds to the second control signal Con2 to the second switching unit S2 constituted by the switching elements T3 and T4. As a result, the second switching unit S2 starts synchronous rectification control. Details of the synchronous rectification control will be described later.

The bootstrap circuit unit 20 includes a first bootstrap circuit 21 and a second bootstrap circuit 22. The first bootstrap circuit 21 is provided between the first drive unit 81 and the first switching unit S1. The second bootstrap circuit 22 is provided between the second drive unit 82 and the second switching unit S2. The first bootstrap circuit 21 has a configuration in which the first diode and a capacitor C1 (not shown) are connected to each other in series. One end of the capacitor C1 is electrically connected to a first connection point P1 where the source of the switching element T1 and the drain of the switching element T2 are electrically connected to each other. The other end of the capacitor C1 is electrically connected to the cathode of the second diode (not shown). The anode of this first diode is electrically connected to the first conductive path 91, for example, and the voltage at a connection point between the cathode of the first diode and the other end of the capacitor C1 (specifically, the voltage at the other end of the capacitor C1) is applied to the first drive unit 81.

The second bootstrap circuit 22 has a configuration in which the second diode and the capacitor C2 (not shown) are connected to each other in series. One end of the capacitor C2 is electrically connected to a second connection point P2 where the source of the switching element T3 and the drain of the switching element T4 are electrically connected to each other. The other end of the capacitor C2 is electrically connected to the cathode of the second diode (not shown). The anode of this diode is electrically connected to the second conductive path 92, for example, and the voltage at a connection point between the cathode of the second diode and the other end of the capacitor C2 (specifically, the voltage at the other end of the capacitor C2) is applied to the second drive unit 82.

In the first conversion operation, the first bootstrap circuit 21 applies, to the first drive unit 81, a voltage that is higher than that at the first connection point P1 between the first high-side element (the switching element T1) and the first low-side element (the switching element T2), to the capacitor C1. Specifically, when the first low-side element (the switching element T2) is in an ON state, energy is stored in the capacitor C1 due to the first voltage V1 being applied to the capacitor C1. Then, when the first high-side element (the switching element T1) is switched ON, the capacitor C1 supplies the stored electric charge to the first drive unit 81. In the second conversion operation, the second bootstrap circuit 22 applies, to the second drive unit 82, a voltage that is higher than that at the second connection point P2 between the second high-side element (the switching element T3) and the second low-side element (the switching element T4). Specifically, when the second low-side element (the switching element T4) is in an ON state, energy is stored in the capacitor C2 due to the second voltage V2 being applied to the capacitor C2. Then, when the second high-side element (the switching element T3) is switched ON, the capacitor C2 supplies the stored electric charge to the second drive unit 82.

The charge-pump circuit unit 30 has a first charge-pump circuit 31, a second charge-pump circuit 32, and an operation control unit 33. Each of the first charge-pump circuit 31 and the second charge-pump circuit 32 is a known circuit, and is constituted by a plurality of diodes that are connected in series and a plurality of capacitors or the like that are connected to connection points where diodes are connected to each other (not shown). The first charge-pump circuit 31 steps up the voltage that is input to the first conductive path 91 or the second conductive path 92 and applies the first output voltage Vo1 to the first drive unit 81, for example. The second charge-pump circuit 32 steps up the voltage that is input to the first conductive path 91 or the second conductive path 92 and applies the second output voltage Vo2 to the second drive unit 82.

The operation control unit 33 is configured to be able to control the operations of the first charge-pump circuit 31 and the second charge-pump circuit 32. The operation control unit 33 is configured to be able to receive a signal (hereinafter, also simply referred to as "first voltage V1") that corresponds to the magnitude of the first voltage V1 received from the first voltage detection unit 41. The operation control unit 33 is configured to be able to receive a signal (hereinafter, also simply referred to as "second voltage V2") that corresponds to the magnitude of the second voltage V2 received from the second voltage detection unit 42. Furthermore, the operation control unit 33 is configured to be able to receive, from the control unit 12, a first power supply unit charging signal Cs1 indicating the state of the first conversion operation or a second power supply unit charging signal Cs2 indicating the state of the second conversion operation. The operation control unit 33 determines the timing at which the first charge-pump circuit 31 is to apply the first output voltage Vo1 and the timing at which the second charge-pump circuit 32 is to apply the second output voltage Vo2, based on the received signals.

Operations of DC-DC Converter

Next, operations of the DC-DC converter 1 according to this disclosure will be described.

Operation for Charging First Power Supply Unit

The operations of the DC-DC converter 1 to charge the first power supply unit include the following two operations. One operation is the operation of stepping up a voltage that is applied to the second conductive path 92 and applying the resulting voltage to the first conductive path 91 in the first conversion operation. The other operation is the operation of stepping down a voltage that is applied to the second conductive path 92 and applying the resulting voltage to the first conductive path 91 in the second conversion operation.

The operation of stepping up a voltage that is applied to the second conductive path 92 and applying the resulting voltage to the first conductive path 91 in the first conversion operation will be described below. First, a charging selection signal Cs is input from an external apparatus to the control unit 12. The charging selection signal Cs indicates that the first power supply unit is to be charged. Then, the first power supply unit charging signal Cs1 for stepping up or down the voltage from the second conductive path 92 toward the first conductive path 91 is transmitted to the operation control unit 33 of the control unit 12. The control unit 12 outputs the first control signal Con1 to the first drive unit 81.

If a first control signal Con1 is output from the control unit 12, the first drive unit 81 outputs the first drive signal D1 that corresponds to the first control signal Con1 to the voltage conversion unit 6. The first drive signal D1 is a signal with which PWM signals with dead times respectively set for the gates of the first switching unit S1 (the switching elements T1 and T2) of the voltage conversion unit 6 are output in a complementary manner. The first switching unit S1 (the switching elements T1 and T2) performs synchronous rectification control according to the first drive signal D1. Specifically, while an ON signal (e.g., an H-level signal) is being output to the switching element T1, an OFF signal (e.g., an L-level signal) is output to the switching element T2. Also, the synchronous rectification control is performed such that, while an ON signal (e.g., an H-level signal) is being output to the switching element T2, an OFF signal (e.g., an L-level signal) is output to the switching element T1.

The first bootstrap circuit 21 applies a voltage that is higher than the voltage at the first connection point P1 between the first high-side element (the switching element T1) and the first low-side element (the switching element T2) to the first drive unit 81 under synchronous rectification control performed by the first switching unit S1. With regard to the first drive signal D1, the potential of the H-level signal in the PWM signal is higher than the potential of the source voltage of the first high-side element (the switching element T1) due to the voltage being applied by the first bootstrap circuit 21. The H-level signal is a voltage signal. As a result, the first high-side element (the switching element T1) can reliably perform a switching operation.

If the operation control unit 33 receives the first power supply unit charging signal Cs1, the first voltage V1 is higher than the second voltage V2, and the difference between the first voltage V1 and the second voltage V2 is a first predetermined threshold or more, the operation control unit 33 outputs a second drive instruction signal Di2 to the second charge-pump circuit 32. When the second charge-pump circuit 32 receives the second drive instruction signal Di2, the second charge-pump circuit 32 applies the second output voltage Vo2 to the second drive unit 82. This is to supplement the function of the second bootstrap circuit 22 that cannot apply an appropriate voltage to the second drive unit 82 as a result of the switching element T3 of the second switching unit S2 being kept in an ON state while the first switching unit S1 performs synchronous rectification control. When the second drive instruction signal Di2 is not input to the second charge-pump circuit 32, the second charge-pump circuit 32 does not apply the second output voltage Vo2 to the second drive unit 82. Also, if the operation control unit 33 receives the first power supply unit charging signal Cs1, the first voltage V1 is higher than the second voltage V2, and the difference between the first voltage V1 and the second voltage V2 is the first predetermined threshold or more, the operation control unit 33 does not output a first drive instruction signal Di1 to the first charge-pump circuit 31.

If the DC second voltage V2 (the input voltage) applied to the second conductive path 92 is to be stepped up according to this control, an output voltage that is higher than the second voltage V2 applied to the second conductive path 92 is applied to the first conductive path 91. The magnitude of the output voltage on the first conductive path 91 is substantially the same as the target voltage value used by the control unit 12. The voltage that is applied to the first conductive path 91 as an output voltage is determined according to the duty cycle of the PWM signal (a first drive signal D1) provided to the gate of the switching element T1. At this time, a second operation maintaining signal Fs2 is output from the control unit 12 to the second drive unit 82, for example. When the second drive unit 82 receives the second operation maintaining signal Fs2, an ON signal is continuously input to the gate of the switching element T3, and the switching element T3 is kept in an ON state. In addition, when the second drive unit 82 receives the second operation maintaining signal Fs2, an OFF signal is continuously input to the gate of the switching element T4, and the switching element T4 is kept in an OFF state.

Next, a case where a voltage that is applied to the second conductive path 92 is stepped down and the resulting voltage is applied to the first conductive path 91 in the second conversion operation will be described. First, a charging selection signal Cs is input from an external apparatus to the control unit 12. The charging selection signal Cs indicates that the first power supply unit is to be charged. Then, the control unit 12 transmits, to the operation control unit 33 of the charge-pump circuit unit 30, the first power supply unit charging signal Cs1 for stepping up or down the voltage from the second conductive path 92 toward the first conductive path 91. The control unit 12 outputs the second control signal Con2 to the second drive unit 82.

When the second control signal Con2 is output from the control unit 12, the second drive unit 82 outputs the second drive signal D2 that corresponds to the second control signal Con2 to the voltage conversion unit 6. The second drive signal D2 is a signal with which PWM signals with dead times respectively set for the gates of the second switching unit S2 (the switching elements T3 and T4) of the voltage conversion unit 6 are output in a complementary manner. The second switching unit S2 (the switching elements T3 and T4) performs synchronous rectification control according to the second drive signal D2. Specifically, while an ON signal (e.g., an H-level signal) is being output to the switching element T3, an OFF signal (e.g., an L-level signal) is output to the switching element T4. Also, the synchronous rectification control is performed such that, while an ON signal (e.g., an H-level signal) is being output to the switching element T4, an OFF signal (e.g., an L-level signal) is output to the switching element T3.

The second bootstrap circuit 22 applies a voltage that is higher than the voltage at the second connection point P2 between the second high-side element (the switching element T3) and the second low-side element (the switching element T4) to the second drive unit 82 under synchronous rectification control performed by the second switching unit S2. With regard to the second drive signal D2, the potential of the H-level signal in the PWM signal is higher than the potential of the source voltage of the second high-side element (the switching element T3) due to the voltage being applied by the second bootstrap circuit 22. The H-level signal is a voltage signal. As a result, the second high-side element (the switching element T3) can reliably perform a switching operation.

If the operation control unit 33 receives the first power supply unit charging signal Cs1, the first voltage V1 is lower than the second voltage V2, and the difference between the first voltage V1 and the second voltage V2 is a second predetermined threshold or more, the operation control unit 33 outputs a first drive instruction signal Di1 to the first charge-pump circuit 31. When the first charge-pump circuit 31 receives the first drive instruction signal Di1, the first charge-pump circuit 31 applies the first output voltage Vo1 to the first drive unit 81. This is to supplement the function of the first bootstrap circuit 21 that cannot apply an appropriate voltage to the first drive unit 81 as a result of the switching element T1 of the first switching unit S1 being kept in an ON state while the second switching unit S2 performs synchronous rectification control. When the first drive instruction signal Di1 is not input to the first charge-pump circuit 31, the first charge-pump circuit 31 does not apply the first output voltage Vo1 to the first drive unit 81. Also, if the operation control unit 33 receives the first power supply unit charging signal Cs1, the first voltage V1 is lower than the second voltage V2, and the difference between the first voltage V1 and the second voltage V2 is the second predetermined threshold or more, the operation control unit 33 does not output the second drive instruction signal Di2 to the second charge-pump circuit 32.

If the DC second voltage V2 (the input voltage) applied to the second conductive path 92 is to be stepped down according to this control, an output voltage that is lower than the second voltage V2 applied to the second conductive path 92 is applied to the first conductive path 91. The magnitude of the output voltage on the first conductive path 91 is substantially the same as the target voltage value used by the control unit 12. The voltage that is applied to the first conductive path 91 as an output voltage is determined according to the duty cycle of the PWM signal (the first drive signal D1) provided to the gate of the switching element T3. At this time, a first operation maintaining signal Fs1 is output from the control unit 12 to the first drive unit 81, for example. When the first drive unit 81 receives the first operation maintaining signal Fs1, an ON signal is continuously input to the gate of the switching element T1, and the switching element T1 is kept in an ON state. In addition, when the first drive unit 81 receives the first operation maintaining signal Fs1, an OFF signal is continuously input to the gate of the switching element T2, and the switching element T2 is kept in an OFF state.

Operations for Charging Second Power Supply Unit

The operations of the DC-DC converter 1 to charge the second power supply unit include the following two operations. One operation is the operation of stepping down a voltage that is applied to the first conductive path 91 and applying the resulting voltage to the second conductive path 92 in the first conversion operation. The other operation is the operation of stepping up a voltage that is applied to the first conductive path 91 and applying the resulting voltage to the second conductive path 92 in the second conversion operation.

The operation of stepping down a voltage that is applied to the first conductive path 91 and applying the resulting voltage to the second conductive path 92 in the first conversion operation will be described below. First, a charging selection signal Cs is input from an external apparatus to the control unit 12. The charging selection signal Cs indicates that the second power supply unit is to be charged. Then, the control unit 12 transmits, to the operation control unit 33, a second power supply unit charging signal Cs2 for stepping up or down the voltage from the first conductive path 91 toward the second conductive path 92. The control unit 12 outputs the first control signal Con1 to the first drive unit 81.

When the first control signal Con1 is output from the control unit 12, the first drive unit 81 outputs the first drive signal D1 that corresponds to the first control signal Con1 to the voltage conversion unit 6. The first switching unit S1 (the switching elements T1 and T2) performs synchronous rectification control according to the first drive signal D1.

The first bootstrap circuit 21 applies a voltage that is higher than the voltage at the first connection point P1 between the first high-side element (the switching element T1) and the first low-side element (the switching element T2) to the first drive unit 81 under synchronous rectification control performed by the first switching unit S1. The potential of the first drive signal D1 is higher than the potential of the source voltage of the first high-side element (the switching element T1) due to the voltage being applied by the first bootstrap circuit 21. As a result, the first high-side element (the switching element T1) can reliably perform a switching operation.

If the operation control unit 33 receives the second power supply unit charging signal Cs2, the first voltage V1 is higher than the second voltage V2, and the difference between the first voltage V1 and the second voltage V2 is a first predetermined threshold or more, the operation control unit 33 outputs the second drive instruction signal Di2 to the second charge-pump circuit 32. When the second charge-pump circuit 32 receives the second drive instruction signal Di2, the second charge-pump circuit 32 applies the second output voltage Vo2 to the second drive unit 82. This is to supplement the function of the second bootstrap circuit 22 that cannot apply an appropriate voltage to the second drive unit 82 as a result of the switching element T3 of the second switching unit S2 being kept in an ON state while the first switching unit S1 performs synchronous rectification control. Also, if the operation control unit 33 receives the second power supply unit charging signal Cs2, the first voltage V1 is higher than the second voltage V2, and the difference between the first voltage V1 and the second voltage V2 is the first predetermined threshold or more, the operation control unit 33 outputs the first drive instruction signal Di1 to the first charge-pump circuit 31.

If the DC first voltage V1 (the input voltage) applied to the first conductive path 91 is to be stepped down according to this control, an output voltage that is lower than the first voltage V1 applied to the first conductive path 91 is applied to the second conductive path 92. The magnitude of the output voltage on the second conductive path 92 is substantially the same as the target voltage value used by the control unit 12. At this time, the second drive unit 82 continuously inputs an ON signal to the gate of the switching element T3, and the switching element T3 is kept in an ON state, according to the second operation maintaining signal Fs2 that is output from the control unit 12 to the second drive unit 82, for example. In addition, when the second drive unit 82 receives the second operation maintaining signal Fs2, an OFF signal is continuously input to the gate of the switching element T4, and the switching element T4 is kept in an OFF state.

Next, a case where a voltage that is applied to the first conductive path 91 is stepped up and a voltage is applied to the second conductive path 92 in the second conversion operation will be described. First, a charging selection signal Cs is input from an external apparatus to the control unit 12. The charging selection signal Cs indicates that the second power supply unit is to be charged. Then, the control unit 12 transmits, to the operation control unit 33, a second power supply unit charging signal Cs2 for stepping up or down the voltage from the first conductive path 91 toward the second conductive path 92. The control unit 12 outputs the second control signal Con2 to the second drive unit 82.

When the second control signal Con2 is output from the control unit 12, the second drive unit 82 outputs the second drive signal D2 that corresponds to the second control signal Con2 to the voltage conversion unit 6. The second switching unit S2 (the switching elements T3 and T4) performs synchronous rectification control according to the second drive signal D2.

The second bootstrap circuit 22 applies a voltage that is higher than the voltage at the second connection point P2 between the second high-side element (the switching element T3) and the second low-side element (the switching element T4) to the second drive unit 82 under synchronous rectification control performed by the second switching unit S2. The potential of the second drive signal D2 is higher than the potential of the source voltage of the second high-side element (the switching element T3) due to the voltage being applied from the second bootstrap circuit 22. As a result, the second high-side element (the switching element T3) can reliably perform a switching operation.

If the operation control unit 33 receives the second power supply unit charging signal Cs2, the first voltage V1 is lower than the second voltage V2, and the difference between the first voltage V1 and the second voltage V2 is a second predetermined threshold or more, the operation control unit 33 outputs the first drive instruction signal Di1 to the first charge-pump circuit 31. When the first charge-pump circuit 31 receives the first drive instruction signal Di1, the first charge-pump circuit 31 applies the first output voltage Vo1 to the first drive unit 81. This is to supplement the function of the first bootstrap circuit 21 that cannot apply an appropriate voltage to the first drive unit 81 as a result of the switching element T1 of the first switching unit S1 being kept in an ON state while the second switching unit S2 performs synchronous rectification control. When the first drive instruction signal Di1 is not input to the first charge-pump circuit 31, the first charge-pump circuit 31 does not apply the first output voltage Vo1 to the first drive unit 81. Also, if the operation control unit 33 receives the second power supply unit charging signal Cs2, the first voltage V1 is lower than the second voltage V2, and the difference between the first voltage V1 and the second voltage V2 is the second predetermined threshold or more, the operation control unit 33 does not output the second drive instruction signal Di2 to the second charge-pump circuit 32.

If the DC first voltage V1 (the input voltage) applied to the first conductive path 91 is to be stepped up according to this control, an output voltage that is higher than the first voltage V1 applied to the first conductive path 91 is applied to the second conductive path 92. The magnitude of the output voltage on the second conductive path 92 is substantially the same as the target voltage value used by the control unit 12. At this time, the first drive unit 81 continuously inputs an ON signal to the gate of the switching element T1, and the switching element T1 is kept in an ON state, according to the first operation maintaining signal Fs1 that is output from the control unit 12 to the first drive unit 81, for example. In addition, when the first drive unit 81 receives the first operation maintaining signal Fs1, an OFF signal is continuously input to the gate of the switching element T2, and the switching element T2 is kept in an OFF state.

Operations of First Charge-Pump Circuit and Second Charge-Pump Circuit when Input Voltage Changes The following describes the operation of the charge-pump circuit unit 30 in a case where, when an output voltage is applied to the second conductive path 92 based on the voltage that is input to the first conductive path 91, the voltage that is input to the first conductive path 91 changes from a high state where the input voltage is higher than the voltage that is output to the second conductive path 92 to a low state where the input voltage is lower than the output voltage.

Figure 2:
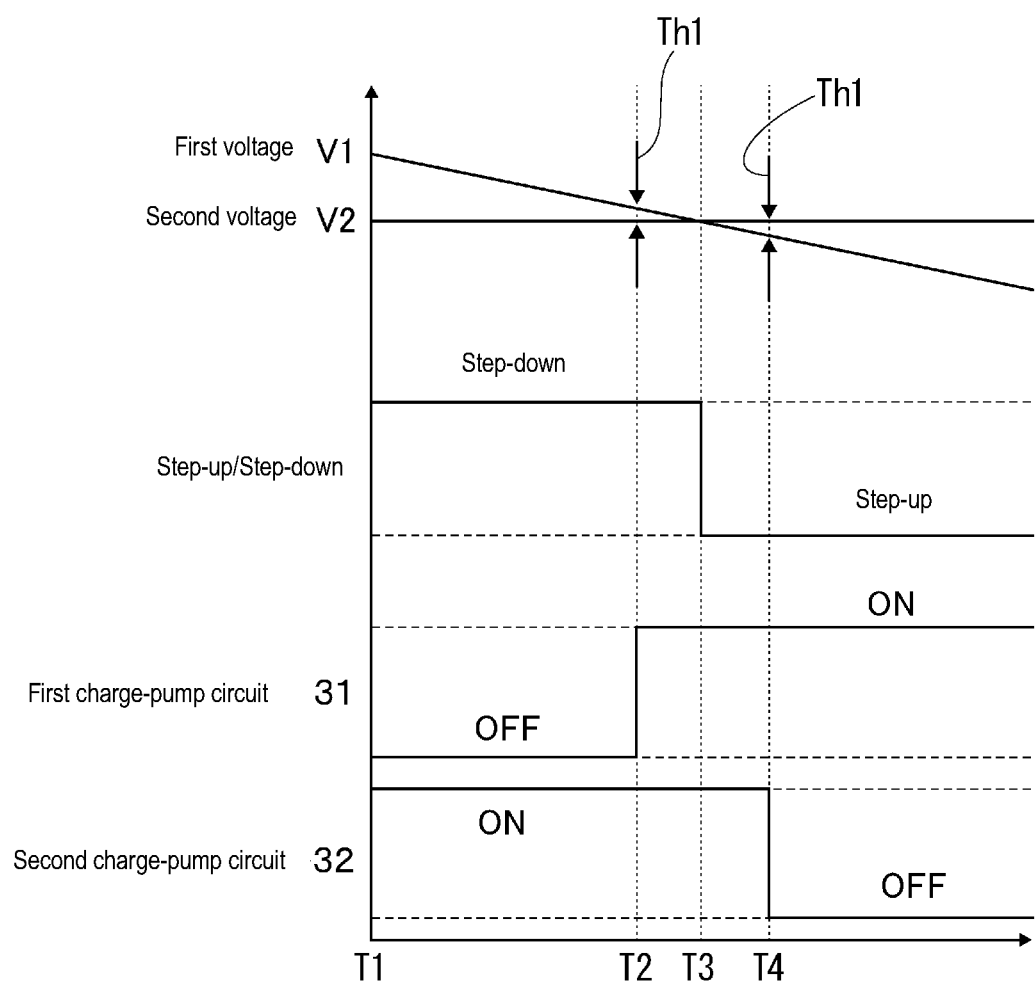
FIG. 2 is a time chart showing operations of a first charge-pump circuit and a second charge-pump circuit when the DC-DC converter according to Embodiment 1 outputs a voltage to a second conductive path based on an input voltage that is applied to a first conductive path, and the input voltage that is applied to the first conductive path changes from a high state where the input voltage is higher than the voltage of the second conductive path to a low state where the input voltage is lower than the voltage of the second conductive path.

First, as shown in FIG. 2, the first voltage V1 on the first conductive path 91 at time T1 is higher than the second voltage V2 on the second conductive path 92, and the difference between the first voltage V1 and the second voltage V2 is a predetermined threshold Th1 (a first threshold) or more. The operation control unit 33 receives the second power supply unit charging signal Cs2 from the control unit 12. The voltage conversion unit 6 steps down the first voltage V1 on the first conductive path 91 and outputs the resulting voltage to the second conductive path 92 as a second voltage V2. The first bootstrap circuit 21 applies a voltage that is higher than the voltage at the first connection point P1 between the first high-side element (the switching element T1) and the first low-side element (the switching element T2) to the first drive unit 81 under synchronous rectification control performed by the first switching unit S1. Because the first drive instruction signal Di1 is not input to the first charge-pump circuit 31, the first charge-pump circuit 31 does not output the first output voltage Vo1 to the first drive unit 81. At this time, the voltage conversion unit 6 performs the first conversion operation. The second charge-pump circuit 32 receives the second drive instruction signal Di2 from the operation control unit 33, and the second output voltage Vo2 is applied to the second drive unit 82.

Then, the first voltage V1 applied to the first conductive path 91 decreases gradually from the time T1 to the time T2, and the difference between the first voltage V1 and the second voltage V2 will be less than the predetermined threshold Th1 (the first threshold) at the time T2. At this time, the potential difference between the drain and the source of the first high-side element (the switching element T1) is small. At this time, the control unit 12 performs control such that the duty cycle of the PWM signal provided to the gate of the first high-side element (the switching element T1) is further extended, and the period of time for which the first high-side element (the switching element T1) is in an ON state is further extended. Accompanying this, the control unit 12 performs control such that the duty cycle of the PWM signal provided to the gate of the first low-side element (the switching element T2) is further shortened, and the period of time for which the first low-side element (the switching element T2) is in an ON state is further shortened. Therefore, energy will not be sufficiently stored in the capacitor C1 of the first bootstrap circuit 21, and the capacitor C1 will not be able to sufficiently supply an electric charge to the first drive unit 81. If the operation control unit 33 receives the second power supply unit charging signal Cs2 from the control unit 12, and the difference between the first voltage V1 and the second voltage V2 is less than the predetermined threshold Th1 (the first threshold), the operation control unit 33 outputs the first drive instruction signal Di1 to the first charge-pump circuit 31. Upon the first charge-pump circuit 31 receiving the first drive instruction signal Di1, the first charge-pump circuit 31 starts to apply the first output voltage Vo1 to the first drive unit 81. Accordingly, the first charge-pump circuit 31 supplements the function of the first bootstrap circuit unit 21.

Then, the first voltage V1 applied to the first conductive path 91 further decreases gradually from the time T2 to time T3. Then, the magnitude of the first voltage V1 becomes smaller than that of the second voltage V2 at the time T3. The voltage conversion unit 6 then switches from the first conversion operation to the second conversion operation. Specifically, the voltage conversion unit 6 steps up the first voltage V1 on the first conductive path 91 and outputs the resulting voltage to the second conductive path 92 as a second voltage V2. At this time, the control unit 12 stops outputting the first control signal Con1 to the first drive unit 81, and starts to output the second control signal Con2 to the second drive unit 82. As a result, the synchronous rectification control performed by the first switching unit S1 is stopped, and the first bootstrap circuit 21 stops applying a voltage to the first drive unit 81. The second bootstrap circuit 22 then starts to apply a voltage that is higher than the voltage at the second connection point P2 between the second high-side element (the switching element T3) and the second low-side element (the switching element T4) to the second drive unit 82 under synchronous rectification control performed by the second switching unit S2.

Then, the first voltage V1 on the first conductive path 91 further decreases gradually from the time T3 to time T4. The difference between the first voltage V1 and the second voltage V2 then reaches or exceeds the predetermined threshold Th1 (the second threshold) at the time T4. At this time, the voltage that is applied to the second drive unit 82 by the second bootstrap circuit 22 is of a sufficient magnitude. The operation control unit 33 then stops outputting the second drive instruction signal Di2 that is output to the second charge-pump circuit 32. The first drive instruction signal Di1 is continuously input to the first charge-pump circuit 31, and the first output voltage Vo1 is continuously applied to the first drive unit 81. Both the first charge-pump circuit 31 and the second charge-pump circuit 32 are driven during the period from the time T2 to the time T4.

The following describes the operation of the charge-pump circuit unit 30 in a case where, when an output voltage is applied to the first conductive path 91 based on the voltage that is input to the second conductive path 92, the voltage that is input to the second conductive path 92 changes from a low state where the input voltage is lower than the voltage that is output to the first conductive path 91 to a high state where the input voltage is higher than the output voltage.

Figure 3:
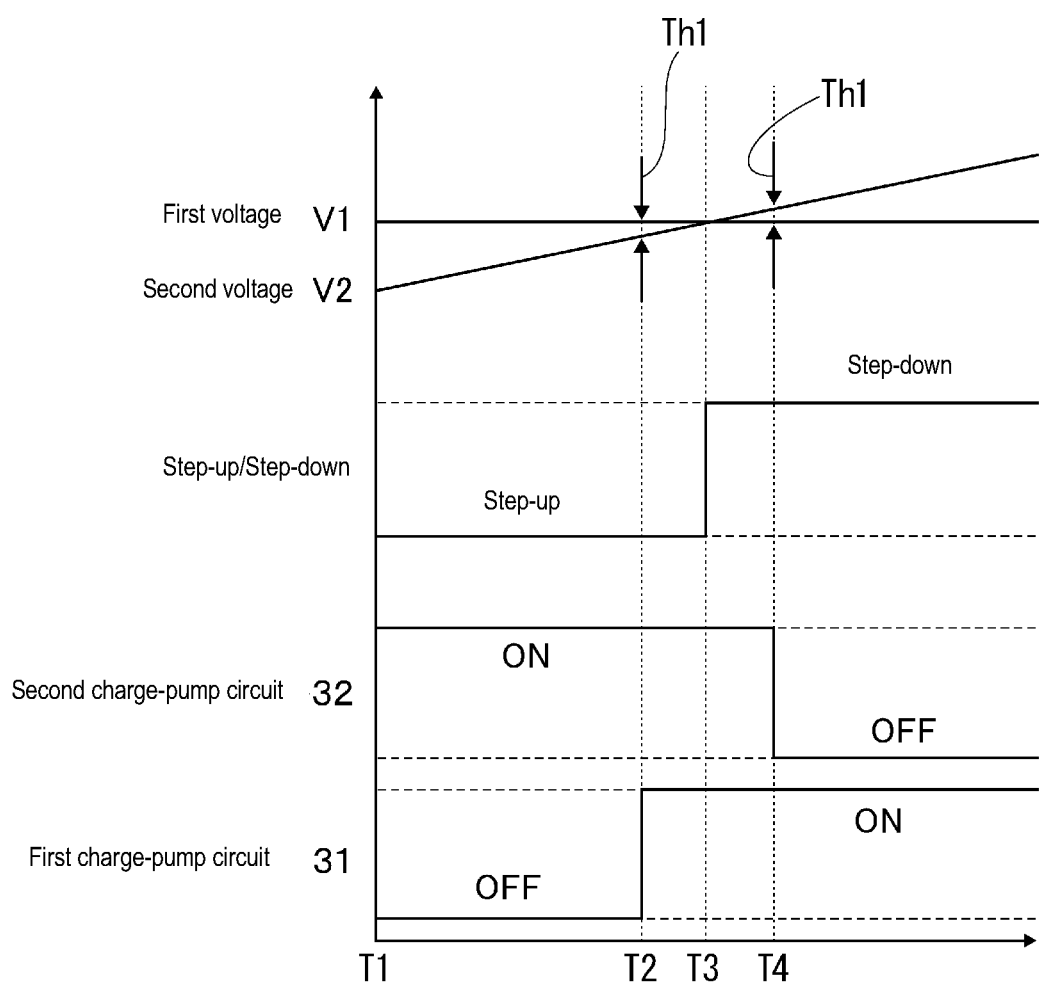
FIG. 3 is a time chart showing operations of the first charge-pump circuit and the second charge-pump circuit when the DC-DC converter according to Embodiment 1 outputs a voltage to the first conductive path based on an input voltage that is applied to the second conductive path, and the input voltage that is applied to the second conductive path changes from a low state where the input voltage is lower than the voltage of the first conductive path to a high state where the input voltage is higher than the voltage of the first conductive path.

First, as shown in FIG. 3, the second voltage V2 on the second conductive path 92 at the time T1 is lower than the first voltage V1 on the first conductive path 91, and the difference between the first voltage V1 and the second voltage V2 is the predetermined threshold Th1 (the first threshold) or more. The operation control unit 33 receives the first power supply unit charging signal Cs1 from the control unit 12. The voltage conversion unit 6 steps up the second voltage V2 on the second conductive path 92 and outputs the resulting voltage to the first conductive path 91 as a first voltage V1. The first bootstrap circuit 21 applies a voltage that is higher than the voltage at the first connection point P1 between the first high-side element (the switching element T1) and the first low-side element (the switching element T2) to the first drive unit 81 under synchronous rectification control performed by the first switching unit S1. Because the first drive instruction signal Di1 is not input to the first charge-pump circuit 31, the first charge-pump circuit 31 does not output the first output voltage Vo1 to the first drive unit 81. At this time, the voltage conversion unit 6 performs the first conversion operation. The second charge-pump circuit 32 receives the second drive instruction signal Di2 from the operation control unit 33, and the second output voltage Vo2 is applied to the second drive unit 82.

Then, the second voltage V2 applied to the second conductive path 92 gradually increases from the time T1 to the time T2, and the difference between the first voltage V1 and the second voltage V2 will be less than the predetermined threshold Th1 (the first threshold) at time T2. At this time, the potential difference between the drain and the source of the first high-side element (the switching element T1) is small. At this time, the control unit 12 performs control such that the duty cycle of the PWM signal provided to the gate of the first high-side element (the switching element T1) is further extended, and the period of time for which the first high-side element (the switching element T1) is in an ON state is further extended. Accompanying this, the control unit 12 performs control such that the duty cycle of the PWM signal provided to the gate of the first low-side element (the switching element T2) is further shortened, and the period of time for which the first low-side element (the switching element T2) is in an ON state is further shortened. Therefore, energy will not be sufficiently stored in the capacitor C1 of the first bootstrap circuit 21, and the capacitor C1 will not be able to sufficiently supply an electric charge to the first drive unit 81. If the operation control unit 33 receives the first power supply unit charging signal Cs1 from the control unit 12, and the difference between the first voltage V1 and the second voltage V2 is less than the predetermined threshold Th1 (the first threshold), the operation control unit 33 outputs the first drive instruction signal Di1 to the first charge-pump circuit 31. Upon the first charge-pump circuit 31 receiving the first drive instruction signal Di1, the first charge-pump circuit 31 starts to apply the first output voltage Vo1 to the first drive unit 81. Accordingly, the first charge-pump circuit 31 supplements the function of the first bootstrap circuit unit 21.

Then, the second voltage V2 applied to the second conductive path 92 further increases gradually from time T2 to time T3. Then, the magnitude of the second voltage V2 exceeds that of the first voltage V1 at the time T3. The voltage conversion unit 6 then switches from the first conversion operation to the second conversion operation. Specifically, the voltage conversion unit 6 steps down the second voltage V2 on the second conductive path 92 and outputs the resulting voltage to the first conductive path 91 as a first voltage V1. At this time, the control unit 12 stops outputting the first control signal Con1 to the first drive unit 81, and starts to output the second control signal Con2 to the second drive unit 82. As a result, the synchronous rectification control performed by the first switching unit S1 is stopped, and the first bootstrap circuit 21 stops applying a voltage to the first drive unit 81. The second bootstrap circuit 22 starts to apply a voltage that is higher than the voltage at the second connection point P2 between the second high-side element (the switching element T3) and the second low-side element (the switching element T4) to the second drive unit 82 as a result of the second switching unit S2 starting synchronous rectification control.

Then, the second voltage V2 on the second conductive path 92 further increases gradually from the time T3 to the time T4. The difference between the first voltage V1 and the second voltage V2 then reaches or exceeds the predetermined threshold Th1 (the second threshold) at the time T4. At this time, the voltage that is applied to the second drive unit 82 by the second bootstrap circuit 22 is of a sufficient magnitude. The operation control unit 33 then stops outputting the second drive instruction signal Di2 that is output to the second charge-pump circuit 32. The first drive instruction signal Di1 is continuously input to the first charge-pump circuit 31, and the first output voltage Vo1 is continuously applied to the first drive unit 81. Both the first charge-pump circuit 31 and the second charge-pump circuit 32 are driven during the period from the time T2 to the time T4.

The following describes the operation of the charge-pump circuit unit 30 in a case where, when an output voltage is applied to the second conductive path 92 based on the voltage that is input to the first conductive path 91, the voltage that is input to the first conductive path 91 changes from a low state where the input voltage is lower than the voltage that is output to the second conductive path 92 to a high state where the input voltage is higher than the output voltage.

Figure 4:
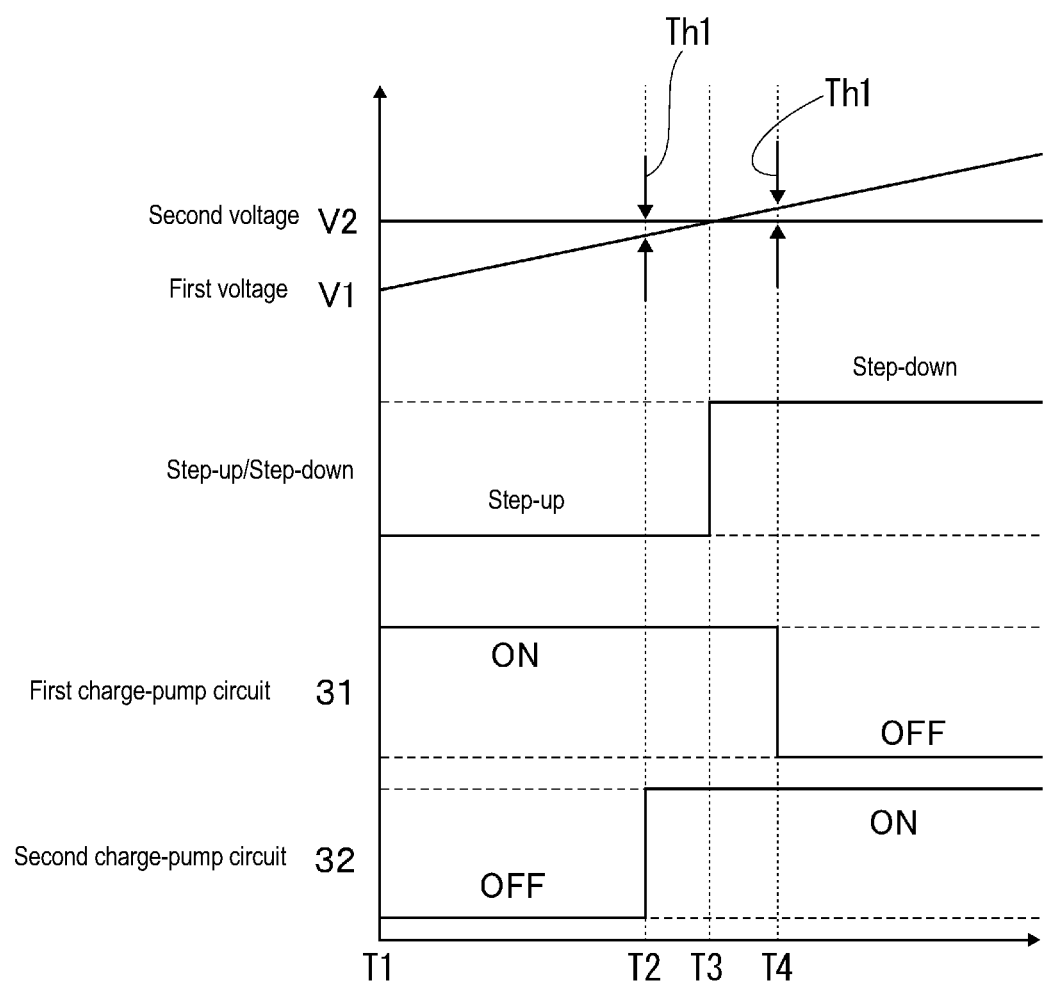
FIG. 4 is a time chart showing operations of the first charge-pump circuit and the second charge-pump circuit when the DC-DC converter according to Embodiment 1 outputs a voltage to the second conductive path based on an input voltage that is applied to the first conductive path, and the input voltage that is applied to the first conductive path changes from a low state where the input voltage is lower than the voltage of the second conductive path to a high state where the input voltage is higher than the voltage of the second conductive path.

First, as shown in FIG. 4, the first voltage V1 on the first conductive path 91 at the time T1 is lower than the second voltage V2 on the second conductive path 92, and the difference between the first voltage V1 and the second voltage V2 is the predetermined threshold Th1 (the second threshold) or more. The operation control unit 33 receives the second power supply unit charging signal Cs2 from the control unit 12. The voltage conversion unit 6 steps up the first voltage V1 on the first conductive path 91 and outputs the resulting voltage to the second conductive path 92 as a second voltage V2. The second bootstrap circuit 22 applies a voltage that is higher than the voltage at the second connection point P2 between the second high-side element (the switching element T3) and the second low-side element (the switching element T4) to the second drive unit 82 under synchronous rectification control performed by the second switching unit S2. Because the second drive instruction signal Di2 is not input to the second charge-pump circuit 32, the second charge-pump circuit 32 does not output the second output voltage Vo2 to the second drive unit 82. At this time, the voltage conversion unit 6 performs the second conversion operation. The first charge-pump circuit 31 receives the first drive instruction signal Di1 from the operation control unit 33, and the first output voltage Vo1 is applied to the first drive unit 81.

Then, the first voltage V1 applied to the first conductive path 91 gradually increases from the time T1 to the time T2, and the difference between the first voltage V1 and the second voltage V2 will be less than the predetermined threshold Th1 (the second threshold) at the time T2. At this time, the potential difference between the drain and the source of the second high-side element (the switching element T3) is small. At this time, the control unit 12 performs control such that the duty cycle of the PWM signal provided to the gate of the second high-side element (the switching element T3) is further extended, and the period of time for which the second high-side element (the switching element T3) is in an ON state is further extended. Accompanying this, the control unit 12 performs control such that the duty cycle of the PWM signal provided to the gate of the second low-side element (the switching element T4) is further shortened, and the period of time for which the second low-side element (the switching element T4) is in an ON state is further shortened. Therefore, energy will not be sufficiently stored in the capacitor C2 of the second bootstrap circuit 22, and the capacitor C2 will not be able to sufficiently supply an electric charge to the second drive unit 82. If the operation control unit 33 receives the second power supply unit charging signal Cs2 from the control unit 12, and the difference between the first voltage V1 and the second voltage V2 is less than the predetermined threshold Th1 (the second threshold), the operation control unit 33 outputs the second drive instruction signal Di2 to the second charge-pump circuit 32. Upon the second charge-pump circuit 32 receiving the second drive instruction signal Di2, the second charge-pump circuit 32 starts to apply the second output voltage Vo2 to the second drive unit 82. Accordingly, the second charge-pump circuit 32 supplements the function of the second bootstrap circuit unit 22.

Then, the first voltage V1 applied to the first conductive path 91 further increases gradually from the time T2 to the time T3. Then, the magnitude of the first voltage V1 exceeds that of the second voltage V2 at the time T3. The voltage conversion unit 6 then switches from the second conversion operation to the first conversion operation. Specifically, the voltage conversion unit 6 steps down the first voltage V1 on the first conductive path 91 and outputs the resulting voltage to the second conductive path 92 as a second voltage V2. At this time, the control unit 12 stops outputting the second control signal Con2 to the second drive unit 82, and starts to output the first control signal Con1 to the first drive unit 81. As a result, the synchronous rectification control performed by the second switching unit S2 is stopped, and the second bootstrap circuit 22 stops applying a voltage to the second drive unit 82. When the synchronous rectification control performed by the first switching unit S1 is started, the first bootstrap circuit 21 starts to apply a voltage that is higher than the voltage at the first connection point P1 between the first high-side element (the switching element T1) and the first low-side element (the switching element T2) to the first drive unit 81.

Then, the first voltage V1 on the first conductive path 91 further increases gradually from the time T3 to the time T4. The difference between the first voltage V1 and the second voltage V2 then reaches or exceeds the predetermined threshold Th1 (the first threshold) at the time T4. At this time, the voltage that is applied to the first drive unit 81 by the first bootstrap circuit 21 is of a sufficient magnitude. The operation control unit 33 then stops outputting the first drive instruction signal Di1 that is output to the first charge-pump circuit 31. The second drive instruction signal Di2 is continuously input to the second charge-pump circuit 32, and the second output voltage Vo2 is continuously applied to the second drive unit 82. Both the first charge-pump circuit 31 and the second charge-pump circuit 32 are driven during the period of time from the time T2 to the time T4.

The following describes the operations of the charge-pump circuit unit 30 in a case where, when an output voltage is applied to the first conductive path 91 based on the voltage that is input to the second conductive path 92, the voltage that is input to the second conductive path 92 changes from a high state where the input voltage is higher than the voltage that is output to the first conductive path 91 to a low state where the input voltage is lower than the output voltage.

Figure 5:
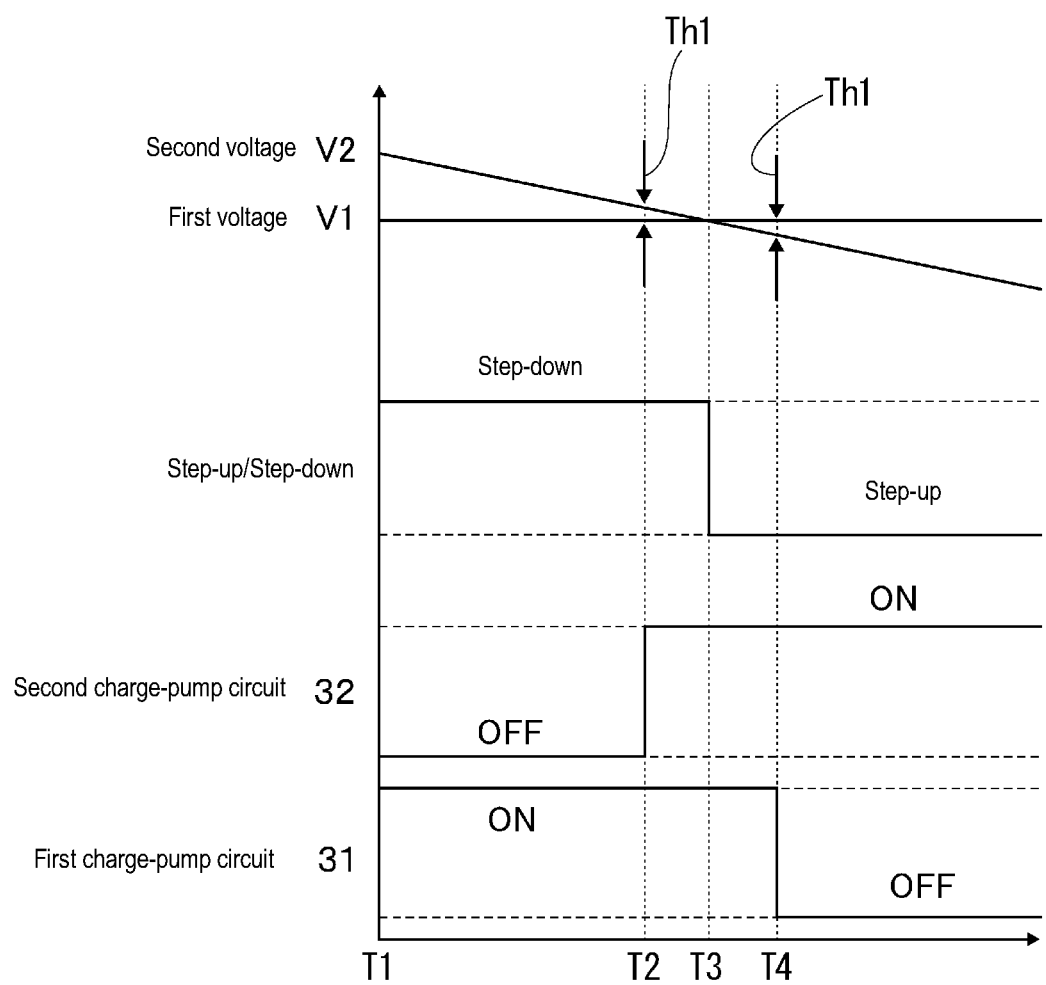
FIG. 5 is a time chart showing operations of the first charge-pump circuit and the second charge-pump circuit when the DC-DC converter according to Embodiment 1 outputs a voltage to the first conductive path based on an input voltage that is applied to the second conductive path, and the input voltage that is applied to the second conductive path changes from a high state where the input voltage is higher than the voltage of the first conductive path to a low state where the input voltage is lower than the voltage of the first conductive path.

First, as shown in FIG. 5, the second voltage V2 on the second conductive path 92 at time T1 is higher than the first voltage V1 on the first conductive path 91, and the difference between the first voltage V1 and the second voltage V2 is a predetermined threshold Th1 (a second threshold) or more. The operation control unit 33 receives the first power supply unit charging signal Cs1 from the control unit 12. The voltage conversion unit 6 steps down the second voltage V2 on the second conductive path 92 and outputs the resulting voltage to the first conductive path 91 as a first voltage V1. The second bootstrap circuit 22 applies a voltage that is higher than the voltage at the second connection point P2 between the second high-side element (the switching element T3) and the second low-side element (the switching element T4) to the second drive unit 82 under synchronous rectification control by the second switching unit S2. Because the second drive instruction signal Di2 is not input to the second charge-pump circuit 32, the second charge-pump circuit 32 does not output the second output voltage Vo2 to the second drive unit 82. At this time, the voltage conversion unit 6 performs the second conversion operation. The first charge-pump circuit 31 receives the first drive instruction signal Di1 from the operation control unit 33, and the first output voltage Vo1 is applied to the first drive unit 81.

Then, the second voltage V2 applied to the second conductive path 92 gradually decreases from the time T1 to the time T2, and the difference between the first voltage V1 and the second voltage V2 is less than the predetermined threshold Th1 (the second threshold) at time T2. At this time, the potential difference between the drain and the source of the second high-side element (the switching element T3) is small. At this time, the control unit 12 performs control such that the duty cycle of the PWM signal provided to the gate of the second high-side element (the switching element T3) is further extended, and the period of time for which the second high-side element (the switching element T3) is in an ON state is further extended. Accompanying this, the control unit 12 performs control such that the duty cycle of the PWM signal provided to the gate of the second low-side element (the switching element T4) is further shortened, and the period of time for which the second low-side element (the switching element T4) is in an ON state is further shortened. Therefore, energy will not be sufficiently stored in the capacitor C2 of the second bootstrap circuit 22, and the capacitor C2 will not be able to sufficiently supply an electric charge to the second drive unit 82. If the operation control unit 33 receives the first power supply unit charging signal Cs1 from the control unit 12, and the difference between the first voltage V1 and the second voltage V2 is less than the predetermined threshold Th1 (the second threshold), the operation control unit 33 outputs the second drive instruction signal Di2 to the second charge-pump circuit 32. Upon the second charge-pump circuit 32 receiving the second drive instruction signal Di2, the second charge-pump circuit 32 starts to apply the second output voltage Vo2 to the second drive unit 82. Accordingly, the second charge-pump circuit 32 supplements the function of the second bootstrap circuit unit 22.

Then, the second voltage V2 applied to the second conductive path 92 further decreases gradually from the time T2 to the time T3. Then, the magnitude of the second voltage V2 becomes smaller than that of the first voltage V1 at the time T3. The voltage conversion unit 6 then switches from the second conversion operation to the first conversion operation. Specifically, the voltage conversion unit 6 steps up the second voltage V2 on the second conductive path 92 and outputs the resulting voltage to the first conductive path 91 as a first voltage V1. At this time, the control unit 12 stops outputting the second control signal Con2 to the second drive unit 82, and starts to output the first control signal Con1 to the first drive unit 81. As a result, the synchronous rectification control performed by the second switching unit S2 is stopped, and the second bootstrap circuit 22 stops applying a voltage to the second drive unit 82. When the synchronous rectification control performed by the first switching unit S1 is started, the first bootstrap circuit 21 starts to apply a voltage that is higher than that at the first connection point P1 between the first high-side element (the switching element T1) and the first low-side element (the switching element T2) to the first drive unit 81.

Then, the second voltage V2 on the second conductive path 92 further decreases gradually from the time T3 to the time T4. The difference between the first voltage V1 and the second voltage V2 then reaches or exceeds the predetermined threshold Th1 (the first threshold) at the time T4. At this time, the voltage that is applied to the first drive unit 81 by the first bootstrap circuit 21 is of a sufficient magnitude. The operation control unit 33 then stops outputting the first drive instruction signal Di1 that is output to the first charge-pump circuit 31. The second drive instruction signal Di2 is continuously input to the second charge-pump circuit 32, and the second output voltage Vo2 is continuously applied to the second drive unit 82. Both the first charge-pump circuit 31 and the second charge-pump circuit 32 are driven during the period of time from the time T2 to the time T4.

Next, effects of this configuration will be described.

The DC-DC converter 1 according to this disclosure includes the voltage conversion unit 6, the control unit 12, the drive unit 8, the first voltage detection unit 41, and the second voltage detection unit 42.

The voltage conversion unit 6 performs bidirectional voltage conversion between the first conductive path 91 and the second conductive path 92. The control unit 12 outputs a control signal for controlling the voltage conversion unit 6. The drive unit 8 outputs the first drive signal D1 and the second drive signal D2 that respectively correspond to the first control signal Con1 and the second control signal Con2 that are output from the control unit 12. The first voltage detection unit 41 detects the first voltage V1 that is applied to the first conductive path 91. The second voltage detection unit 42 detects the second voltage V2 that is applied to the second conductive path 92. The voltage conversion unit 6 performs the first conversion operation and the second conversion operation. In first conversion operation, at least either the operation of stepping down a voltage that is applied to the first conductive path 91 and applying the resulting voltage to the second conductive path 92 or the operation of stepping up a voltage that is applied to the second conductive path 92 and applying the resulting voltage to the first conductive path 91 is performed. In the second conversion operation, at least either the operation of stepping up the voltage that is applied to the first conductive path 91 and applying the resulting voltage to the second conductive path 92 or the operation of stepping down a voltage that is applied to the second conductive path 92 and applying the resulting voltage to the first conductive path 91 is performed. The control unit 12 outputs the first control signal Con1 for performing the first conversion operation and the second control signal Con2 for performing the second conversion operation.

The drive unit 8 includes the first drive unit 81 and the second drive unit 82. When the first control signal Con1 is output from the control unit 12, the first drive unit 81 outputs the first drive signal D1 that corresponds to the first control signal Con1 to the voltage conversion unit 6. When the second control signal Con2 is output from the control unit 12, the second drive unit 82 outputs the second drive signal D2 that corresponds to the second control signal Con2 to the voltage conversion unit 6. The voltage conversion unit 6 includes the first switching unit S1 and the second switching unit S2. The first switching unit S1 includes the switching element T1 and the switching element T2, and is supplied with the first drive signal D1. The second switching unit S2 includes the switching element T3 and the switching element T4, and is supplied with the second drive signal D2. When the first drive signal D1 is provided to the first switching unit S1, the voltage conversion unit 6 performs the first conversion operation. When the second drive signal D2 is provided to the second switching unit S2, the voltage conversion unit 6 performs the second conversion operation.

Furthermore, the DC-DC converter 1 according to this disclosure includes the bootstrap circuit unit 20 and the charge-pump circuit unit 30. The bootstrap circuit unit 20 applies a voltage that is higher than that at the first connection point P1 between the switching elements T1 and T2 to the drive unit 8 in the first conversion operation, and applies a voltage that is higher than that at the second connection point P2 between the switching elements T3 and T4 to the drive unit 8 in the second conversion operation. The charge-pump circuit unit 30 steps up an input voltage and applies an output voltage that is higher than the input voltage to the drive unit 8. The drive unit 8 outputs the first drive signal D1 and the second drive signal D2 that include a voltage signal that corresponds to a voltage that is applied by the bootstrap circuit unit 20 or a voltage that is applied by the charge-pump circuit unit 30. The charge-pump circuit unit 30 determines the operation timing at which the charge-pump circuit unit 30 is to apply the output voltage, based on the first voltage V1, the second voltage V2, and the first power supply unit charging signal Cs1 indicating the state of the first conversion operation or the second power supply unit charging signal Cs2 indicating the state of the second conversion operation.

In the first conversion operation or the second conversion operation, the DC-DC converter 1 may apply, to the drive unit 8, a voltage that is higher than the voltage at the first connection point P1 between the switching elements T1 and T2 or a voltage that is higher than the voltage at the second connection point P2 between the switching elements T3 and T4, using the bootstrap circuit unit 20. Furthermore, the charge-pump circuit unit 30 can determine the operation timing at which the charge-pump circuit unit 30 is to apply the output voltage, based on the first voltage V1 and the second voltage V2. Therefore, with a configuration in which bidirectional voltage conversion can be performed, even if the bootstrap circuit 20 cannot apply an appropriate voltage at the operation timing determined by the charge-pump circuit unit 30, a voltage that is higher than the appropriate voltage may be applied by the charge-pump circuit unit 30. Furthermore, there is no need to keep the charge-pump circuit unit 30 operating all the time, and it is possible to operate the charge-pump circuit unit 30 at the required timing in which the first voltage V1, the second voltage V2, and the first power supply unit charging signal Cs1 indicating the state of the first conversion operation or the second power supply unit charging signal Cs2 indicating the state of the second conversion operation are reflected, and thus it is possible to reduce power consumption.

The charge-pump circuit unit 30 of the DC-DC converter 1 according to this disclosure applies an output voltage to the first drive unit 81 if the difference between the first voltage V1 and the second voltage V2 is less than the threshold Th1 (the first threshold) in a state where the first conversion operation is being performed.

With such a configuration, when the difference between the first voltage V1 and the second voltage V2 is less than the threshold Th1 (the first threshold) in the first conversion operation and there is a growing concern that an appropriate voltage may not be applied by the bootstrap circuit unit 20, this DC-DC converter 1 may operate the charge-pump circuit unit 30 and apply a voltage to the drive unit 8. Specifically, if the difference between the first voltage V1 and the second voltage V2 is less than the threshold Th1 (the first threshold), the duty cycle of the PWM signal provided to the gate of the first high-side element (the switching element T1) is further extended. Accompanying this, the duty cycle of the PWM signal provided to the gate of the first low-side element (the switching element T2) is further shortened, and the period of time for which the first low-side element (the switching element T2) is in an ON state is further shortened. Therefore, energy will not be sufficiently stored in the capacitor C1 of the first bootstrap circuit 21, and the charge-pump circuit 30 is operated when the capacitor C1 is unable to sufficiently supply an electric charge to the first drive unit 81. Also, regardless of the magnitude of the absolute value of the first voltage V1 or the second voltage V2, the operation of the charge-pump circuit unit 30 is switched based on the relative relationship between the first voltage V1 and the second voltage V2. Therefore, the voltage that is output to the first conductive path 91 or the second conductive path 92 is not limited to having a specific value, and an output voltage of a desired magnitude can be used.

The charge-pump circuit unit 30 of the DC-DC converter 1 according to this disclosure applies an output voltage to the second drive unit 82 if the difference between the first voltage V1 and the second voltage V2 is less than the threshold Th1 (the second threshold) in a state where the second conversion operation is being performed.

With such a configuration, when the difference between the first voltage V1 and the second voltage V2 is less than the threshold Th1 (the second threshold) in the second conversion operation and there is a growing concern that an appropriate voltage may not be applied by the bootstrap circuit unit 20, this DC-DC converter 1 may operate the charge-pump circuit unit 30 and apply a voltage to the drive unit 8. Specifically, if the difference between the first voltage V1 and the second voltage V2 is less than the threshold Th1 (the second threshold), the duty cycle of the PWM signal provided to the gate of the second high-side element (the switching element T3) is further extended. Accompanying this, the duty cycle of the PWM signal provided to the gate of the second low-side element (the switching element T4) is further shortened, and the period of time for which the second low-side element (the switching element T4) is in an ON state is further shortened. Therefore, energy will not be sufficiently stored in the capacitor C2 of the second bootstrap circuit 22, and the charge-pump circuit 30 is operated when the capacitor C2 is unable to sufficiently supply an electric charge to the second drive unit 82. Also, regardless of the magnitude of the absolute value of the first voltage V1 or the second voltage V2, the operation of the charge-pump circuit unit 30 is switched based on the relative relationship between the first voltage V1 and the second voltage V2. Therefore, the voltage that is output to the first conductive path 91 or the second conductive path 92 is not limited to having a specific value, and an output voltage of a desired magnitude can be used.

If the first conversion operation is being performed so as to step down a voltage that is applied to the first conductive path 91 and apply the resulting voltage to the second conductive path 92, or if the second conversion operation is being performed so as to step down a voltage that is applied to the second conductive path 92 and apply the resulting voltage to the first conductive path 91, the charge-pump circuit unit 30 of the DC-DC converter 1 according to this disclosure applies an output voltage to the first drive unit 81 when the second voltage V2 is larger than the first voltage V1, and applies an output voltage to the second drive unit 82 when the first voltage V1 is larger than the second voltage V2.

With such a configuration, when a step-down operation is performed between the first conductive path 91 and the second conductive path 92 and the first voltage V1 is larger than the second voltage V2, the second switching unit S2 does not perform a switching operation, and thus the second bootstrap circuit unit 22 cannot apply an appropriate voltage to the second drive unit 82. When there is a growing concern that the second high-side element (the switching element T3) cannot be reliably switched ON, this DC-DC converter 1 can reliably switch the switching element T3 ON using the second charge-pump circuit unit 32. Furthermore, when the second voltage V2 is larger than the first voltage V1, the first switching unit S1 does not perform a switching operation, and thus the first bootstrap circuit unit 21 cannot apply an appropriate voltage to the first drive unit 81. When there is a growing concern that the first high-side element (the switching element T1) cannot be reliably switched ON, the switching element T1 can be reliably switched ON by the first charge-pump circuit unit 31. As a result, this DC-DC converter 1 can favorably exchange power between the first conductive path 91 and the second conductive path 92.

Specifically, when the first conversion operation is performed so as to step down the voltage that is applied to the first conductive path 91 and apply the resulting voltage to the second conductive path 92, the capacitor C2 will not be charged because the second low-side element (the switching element T4) is kept in an OFF state. At this time, the switching element T3 of the second switching unit S2 is reliably switched ON by applying the second output voltage Vo2 from the second charge-pump circuit 32 to the second drive unit 82. Then, when the second conversion operation is performed so as to step down the voltage that is applied to the second conductive path 92 and apply the resulting voltage to the first conductive path 91, the capacitor C1 will not be charged because the first low-side element (the switching element T2) is kept in an OFF state. At this time, the switching element T1 of the first switching unit S1 is reliably switched ON by applying the first output voltage Vo1 from the first charge-pump circuit 31 to the first drive unit 81.

If the first conversion operation is being performed so as to step up a voltage that is applied to the second conductive path 92 and apply the resulting voltage to the first conductive path 91, or if the second conversion operation is being performed so as to step up a voltage that is applied to the first conductive path 91 and apply the resulting voltage to the second conductive path 92, the charge-pump circuit unit 30 of the DC-DC converter 1 according to this disclosure applies an output voltage to the second drive unit 82 when the first voltage V1 is larger than the second voltage V2, and applies an output voltage to the first drive unit 81 when the second voltage V2 is larger than the first voltage V1.

With such a configuration, when a step-up operation is performed between the first conductive path 91 and the second conductive path 92 and the first voltage V1 is larger than the second voltage V2, the second switching unit S2 does not perform a switching operation, and thus the second bootstrap circuit unit 22 cannot apply an appropriate voltage to the second drive unit 82. When there is a growing concern that the second high-side element (the switching element T3) cannot be reliably switched ON, this DC-DC converter 1 can reliably switch the switching element T2 ON using the second charge-pump circuit unit 32. Furthermore, when the second voltage V2 is larger than the first voltage V1, the first switching unit S1 does not perform a switching operation, and thus the first bootstrap circuit unit 21 cannot apply an appropriate voltage to the first drive unit 81. When there is a growing concern that the first high-side element (the switching element T1) cannot be reliably switched ON, the switching element T1 can be reliably switched ON by the first charge-pump circuit unit 31. As a result, this DC-DC converter 1 can favorably exchange power between the first conductive path 91 and the second conductive path 92.

Specifically, when the first conversion operation is performed so as to step up the voltage that is applied to the second conductive path 92 and apply the resulting voltage to the first conductive path 91, the capacitor C2 will not be charged because the second low-side element (the switching element T4) is kept in an OFF state. At this time, the switching element T2 of the second switching unit S2 is reliably switched ON by applying the second output voltage Vo2 from the second charge-pump circuit 32 to the second drive unit 82. Then, when the second conversion operation is performed so as to step up the voltage that is applied to the first conductive path 91 and apply the resulting voltage to the second conductive path 92, the capacitor C1 will not be charged because the first low-side element (the switching element T2) is kept in an OFF state. At this time, the switching element T1 of the first switching unit S1 is reliably switched ON by applying the first output voltage Vo1 from the first charge-pump circuit 31 to the first drive unit 81.

The charge-pump circuit unit 30 of the DC-DC converter 1 according to this disclosure includes the first charge-pump circuit 31, the second charge-pump circuit 32, and the operation control unit 33. The first charge-pump circuit 31 applies the first output voltage Vo1 to the first drive unit 81. The second charge-pump circuit 32 applies the second output voltage Vo2 to the second drive unit 82. The operation control unit 33 controls the operations of the first charge-pump circuit 31 and the second charge-pump circuit 32. The operation control unit 33 determines the timing at which the first charge-pump circuit 31 is to apply the first output voltage Vo1 and the timing at which the second charge-pump circuit 32 is to apply the second output voltage Vo2, based on the first voltage V1, the second voltage V2, and the first power supply unit charging signal Cs1 indicating the state of the first conversion operation or the second power supply unit charging signal Cs2 indicating the state of the second conversion operation.

According to this configuration, the DC-DC converter 1 can apply voltages to the first drive unit 81 and the second drive unit 82 individually, and thus, it is possible to individually drive the first switching unit S1 and the second switching unit S2, and to efficiently operate the voltage conversion unit 6.

Embodiment 2

Figure 6:
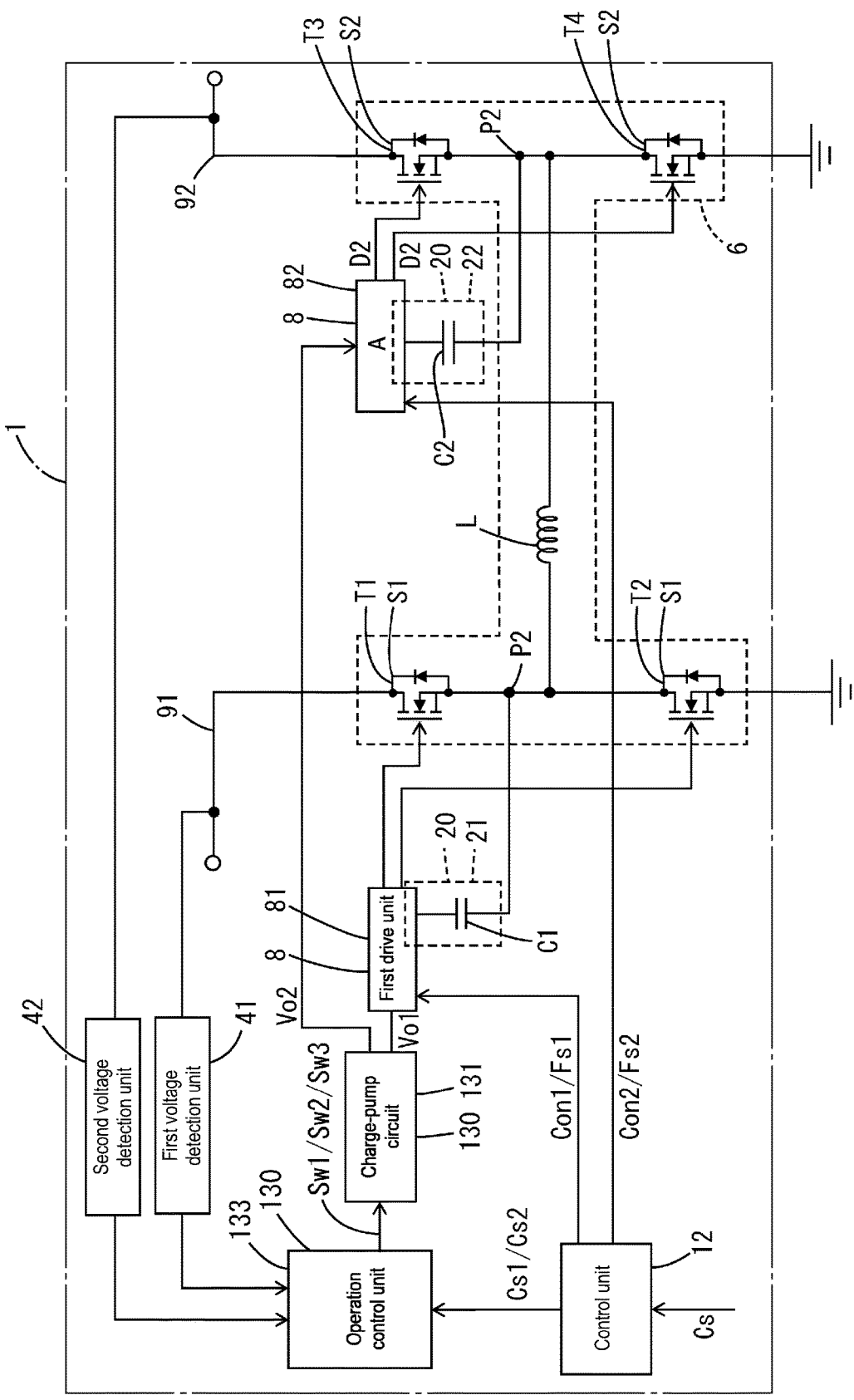
FIG. 6 is a circuit diagram showing a DC-DC converter according to Embodiment 2.

Next, a DC-DC converter 2 according to Embodiment 2 will be described with reference to FIG. 6. Embodiment 2 is different from Embodiment 1 in that the DC-DC converter 2 is provided with only one charge-pump circuit 131 in a charge-pump circuit unit 130. The same constituent elements are given the same reference numerals, and structures and effects thereof will not be described.

The charge-pump circuit unit 130 of the DC-DC converter 2 includes a charge-pump circuit 131 and an operation control unit 133. The charge-pump circuit 131 is a known circuit, and is constituted by a plurality of diodes that are connected in series and a plurality of capacitors that are connected to connection points where diodes are connected to each other (not shown). The charge-pump circuit 131 steps up the voltage that is input to a first conductive path 91 or a second conductive path 92, and applies a first output voltage Vo1 to a first drive unit 81, or applies a second output voltage Vo2 to a second drive unit 82. The operation control unit 133 is configured to be able to control the operation of the charge-pump circuit 131. The operation control unit 133 is configured to receive a signal that corresponds to the first voltage V1 from a first voltage detection unit 41, a signal that corresponds to the second voltage V2 from a second voltage detection unit 42, a first power supply unit charging signal Cs1, and a second power supply unit charging signal Cs2 from the control unit 12. The operation control unit 133 determines the timing at which the charge-pump circuit 131 is to apply the first output voltage Vo1 and the timing at which the charge-pump circuit 131 is to apply the second output voltage Vo2, based on the received signals.

Operations of DC-DC Converter

Next, the operations of the DC-DC converter 2 according to this disclosure will be described.

Operation for Charging First Power Supply Unit

The operation of stepping up a voltage that is applied to the second conductive path 92 and applying the resulting voltage to the first conductive path 91 in the first conversion operation will be described below. If the charging selection signal Cs that is input from an external apparatus to the control unit 12 indicates that the first power supply unit is to be charged, the control unit 12 outputs the first power supply unit charging signal Cs1 to the operation control unit 133. The control unit 12 then outputs the first control signal Con1 to the first drive unit 81. When the first control signal Con1 is output from the control unit 12, the first drive unit 81 outputs the first drive signal D1 that corresponds to the first control signal Con1 to the voltage conversion unit 6. The first switching unit S1 (the switching elements T1 and T2) performs synchronous rectification control according to the first drive signal D1. The first bootstrap circuit 21 applies a voltage that is higher than the voltage at the first connection point P1 between the first high-side element (the switching element T1) and the first low-side element (the switching element T2) to the first drive unit 81 under synchronous rectification control by the first switching unit S1.

If the operation control unit 133 receives the first power supply unit charging signal Cs1, the first voltage V1 is higher than the second voltage V2, and the difference between the first voltage V1 and the second voltage V2 is a predetermined threshold (the first threshold) or more, the operation control unit 133 outputs a second switching signal Sw2 to the charge-pump circuit 131. When the charge-pump circuit 131 receives the second switching signal Sw2, the charge-pump circuit 131 applies a second output voltage Vo2 to the second drive unit 82, and does not apply the first output voltage Vo1 to the first drive unit 81. That is, the charge-pump circuit unit 130 performs the second operation of applying the second output voltage Vo2 to the second drive unit 82.

Next, a case where a voltage that is applied to the second conductive path 92 is stepped down and the resulting voltage is applied to the first conductive path 91 in the second conversion operation will be described. If the charging selection signal that is input from an external apparatus to the control unit 12 indicates that the first power supply unit is to be charged, the control unit 12 outputs the first power supply unit charging signal Cs1 to the operation control unit 133. The control unit 12 outputs the second control signal Con2 to the second drive unit 82. When the second control signal Con2 is output from the control unit 12, the second drive unit 82 outputs the second drive signal D2 that corresponds to the second control signal Con2 to the voltage conversion unit 6. The second switching unit S2 (the switching elements T3 and T4) performs synchronous rectification control according to the second drive signal D2. The second bootstrap circuit 22 applies a voltage that is higher than the voltage at the second connection point P2 between the second high-side element (the switching element T3) and the second low-side element (the switching element T4) to the second drive unit 82 under the synchronous rectification control by the second switching unit S2.

If the operation control unit 133 receives the first power supply unit charging signal Cs1, the first voltage V1 is lower than the second voltage V2, and the difference between the first voltage V1 and the second voltage V2 is a predetermined threshold (the second threshold) or more, the operation control unit 133 outputs a first switching signal Sw1 to the charge-pump circuit 131. When the charge-pump circuit 131 receives the first switching signal Sw1, the charge-pump circuit 131 applies a first output voltage Vo1 to the first drive unit 81, and does not apply the second output voltage Vo2 to the second drive unit 82. That is, the charge-pump circuit unit 130 performs the first operation of applying the first output voltage Vo1 to the first drive unit 81.

Operation for Charging Second Power Supply Unit

The operation of stepping down a voltage that is applied to the first conductive path 91 and applying the resulting voltage to the second conductive path 92 in the first conversion operation will be described below. If the charging selection signal Cs that is input from an external apparatus to the control unit 12 indicates that the second power supply unit is to be charged, the control unit 12 outputs the second power supply unit charging signal Cs2 to the operation control unit 133. The control unit 12 outputs the first control signal Con1 to the first drive unit 81. When the first control signal Con1 is output from the control unit 12, the first drive unit 81 outputs the first drive signal D1 that corresponds to the first control signal Con1 to the voltage conversion unit 6. The first switching unit S1 (the switching elements T1 and T2) performs synchronous rectification control according to the first drive signal D1. The first bootstrap circuit 21 applies a voltage that is higher than the voltage at the first connection point P1 between the first high-side element (the switching element T1) and the first low-side element (the switching element T2) to the first drive unit 81 under the synchronous rectification control by the first switching unit S1.

If the operation control unit 133 receives the second power supply unit charging signal Cs2, the first voltage V1 is higher than the second voltage V2, and the difference between the first voltage V1 and the second voltage V2 is a predetermined threshold (the first threshold) or more, the operation control unit 133 outputs a second switching signal Sw2 to the charge-pump circuit 131. When the charge-pump circuit 131 receives the second switching signal Sw2, the charge-pump circuit 131 applies a second output voltage Vo2 to the second drive unit 82, and does not apply the first output voltage Vo1 to the first drive unit 81. That is, the charge-pump circuit unit 130 performs the second operation of applying the second output voltage Vo2 to the second drive unit 82.

Next, a case where a voltage that is applied to the first conductive path 91 is stepped up and the resulting voltage is applied to the second conductive path 92 in the second conversion operation will be described. If the charging selection signal Cs that is input from an external apparatus to the control unit 12 indicates that the second power supply unit is to be charged, the control unit 12 outputs the second power supply unit charging signal Cs2 to the operation control unit 133. The control unit 12 outputs the second control signal Con2 to the second drive unit 82. When the second control signal Con2 is output from the control unit 12, the second drive unit 82 outputs the second drive signal D2 that corresponds to the second control signal Con2 to the voltage conversion unit 6. The second switching unit S2 (the switching elements T3 and T4) performs synchronous rectification control according to the second drive signal D2. The second bootstrap circuit 22 applies a voltage that is higher than the voltage at the second connection point P2 between the second high-side element (the switching element T3) and the second low-side element (the switching element T4) to the second drive unit 82 under synchronous rectification control by the second switching unit S2.

If the operation control unit 133 receives the second power supply unit charging signal Cs2, the first voltage V1 is lower than the second voltage V2, and the difference between the first voltage V1 and the second voltage V2 is a predetermined threshold (the second threshold) or more, the operation control unit 133 outputs a first switching signal Sw1 toward the charge-pump circuit 131. When the charge-pump circuit 131 receives the first switching signal Sw1, the charge-pump circuit 131 applies a first output voltage Vo1 to the first drive unit 81, and does not apply the second output voltage Vo2 to the second drive unit 82. That is, the charge-pump circuit unit 130 performs the first operation of applying the first output voltage Vo1 to the first drive unit 81.

If the operation control unit 133 receives either the first power supply unit charging signal Cs1 or the second power supply unit charging signal Cs2, and the difference between the first voltage V1 and the second voltage V2 is less than the predetermined threshold (the second threshold or the first threshold), the operation control unit 133 outputs a third switching signal Sw3 to the charge-pump circuit 131. When the charge-pump circuit 131 receives the third switching signal Sw3, the charge-pump circuit 131 applies the first output voltage Vo1 to the first drive unit 81, and applies the second output voltage Vo2 to the second drive unit 82.

Next, effects of this configuration will be described.

The charge-pump circuit unit 130 of the DC-DC converter 2 according to this disclosure includes the charge-pump circuit 131 and the operation control unit 133. The charge-pump circuit 131 performs the first operation for applying the first output voltage Vo1 to the first drive unit 81 and the second operation for applying the second output voltage Vo2 to the second drive unit 82. The operation control unit 133 controls the first operation and the second operation of the charge-pump circuit 131. The operation control unit 133 determines the timing of the first operation and the timing of the second operation based on the first voltage V1, the second voltage V2, the first power supply unit charging signal Cs1 indicating the state of the first conversion operation, or the second power supply unit charging signal Cs2 indicating the state of the second conversion operation.

According to this configuration, the charge-pump circuit 131 can switch at least one of the first operation and the second operation using the operation control unit 133. Thus, the DC-DC converter 2 can reduce the number of members, compared to a case where two charge-pump circuits 131 are provided corresponding to the first drive unit 81 and the second drive unit 82.

Other Embodiments

This configuration is not limited to the embodiments described above using the foregoing description and drawings, and embodiments such as the following are also encompassed in the technical scope of the present invention.

Although the drive unit 8 includes the first drive unit 81 and the second drive unit 82 in Embodiments 1 and 2 as an example, a configuration may be adopted in which drive signals are output from one drive unit to the first switching unit and the second switching unit.

Although N-channel MOSFETs are used as the switching elements T2 and T4 in Embodiments 1 and 2, a diode rectification method may be used using a diode for either or both of the switching elements T2 and T4.

Although the first threshold and the second threshold are both illustrated as being the threshold Th1 in Embodiment 1, the first threshold and the second threshold may be different from each other.

The embodiments disclosed here are to be considered in all aspects to be illustrative and not restrictive. The scope of the present invention is defined by the claims and not by the embodiments disclosed here, and all changes that come within the meaning and range of equivalency of the claims are intended to be embraced therein.

The invention claimed is:

1. A DC-DC converter comprising:
    a voltage conversion unit configured to perform bidirectional voltage conversion between a first conductive path and a second conductive path;
    a control unit configured to output a control signal for controlling the voltage conversion unit; a drive unit configured to output a drive signal that corresponds to the control signal that is output from the control unit;
    a first voltage detection unit configured to detect a first voltage that is applied to the first conductive path; and
    a second voltage detection unit configured to detect a second voltage that is applied to the second conductive path,
    wherein the voltage conversion unit is configured to perform a first conversion operation, which is at least either an operation for stepping down a voltage that is applied to the first conductive path and applying a resulting voltage to the second conductive path or an operation for stepping up a voltage that is applied to the second conductive path and applying a resulting voltage to the first conductive path, and to perform a second conversion operation, which is at least either an operation for stepping up a voltage that is applied to the first conductive path and applying a resulting voltage to the second conductive path or an operation for stepping down a voltage that is applied to the second conductive path and applying a resulting voltage to the first conductive path,
    the control unit is configured to output a first control signal for performing the first conversion operation and a second control signal for performing the second conversion operation, the drive unit includes a first drive unit configured to output a first drive signal that corresponds to the first control signal to the voltage conversion unit when the first control signal is output from the control unit, and a second drive unit configured to output a second drive signal that corresponds to the second control signal to the voltage conversion unit when the second control signal is output from the control unit, the voltage conversion unit includes a first switching unit that includes a first high-side element including a switch and a first low-side element including a switch or a diode and that is supplied with the first drive signal, and a second switching unit that includes a second high-side element including a switch and a second low-side element including a switch or a diode and that is supplied with the second drive signal, the voltage conversion unit is configured to perform the first conversion operation when the first drive signal is supplied to the first switching unit, the voltage conversion unit is configured to perform the second conversion operation when the second drive signal is supplied to the second switching unit, the DC-DC converter further comprising:

a bootstrap circuit unit configured to apply, to the drive unit, a voltage that is higher than a voltage at a first connection point between the first high-side element and the first low-side element in the first conversion operation, and apply, to the drive unit, a voltage that is higher than a voltage at a second connection point between the second high-side element and the second low-side element in the second conversion operation; and a charge-pump circuit unit configured to step up an input voltage and apply an output voltage that is higher than the input voltage to the drive unit, wherein the drive unit is configured to output the first drive signal and the second drive signal that include a voltage signal that corresponds to a voltage that is applied by the bootstrap circuit unit or a voltage that is applied by the charge-pump circuit unit, and the charge-pump circuit unit is configured to determine an operation timing at which the charge-pump circuit unit is to apply the output voltage, based on the first voltage, the second voltage, and a state of the first conversion operation or the second conversion operation.

2. The DC-DC converter according to claim 1, wherein, if at least a difference between the first voltage and the second voltage is less than a first threshold in a state where the first conversion operation is being performed, the charge-pump circuit unit applies the output voltage to the first drive unit.

3. The DC-DC converter according to claim 1, wherein, if at least a difference between the first voltage and the second voltage is less than a second threshold in a state where the second conversion operation is being performed, the charge-pump circuit unit applies the output voltage to the second drive unit.

4. The DC-DC converter according to claim 1, wherein, if the first conversion operation is being performed so as to step down the voltage that is applied to the first conductive path and apply the resulting voltage to the second conductive path, or if the second conversion operation is being performed so as to step down the voltage that is applied to the second conductive path and apply the resulting voltage to the first conductive path, the charge-pump circuit unit applies the output voltage to the first drive unit when the second voltage is larger than the first voltage, and applies the output voltage to the second drive unit when the first voltage is larger than the second voltage.

5. The DC-DC converter according to claim 1, wherein, if the first conversion operation is being performed so as to step up the voltage that is applied to the second conductive path and apply the resulting voltage to the first conductive path, or if the second conversion operation is being performed so as to step up the voltage that is applied to the first conductive path and apply the resulting voltage to the second conductive path, the charge-pump circuit unit applies the output voltage to the second drive unit when the first voltage is larger than the second voltage, and applies the output voltage to the first drive unit when the second voltage is larger than the first voltage.

6. The DC-DC converter according to claim 1, wherein the charge-pump circuit unit includes a first charge-pump circuit configured to apply a first output voltage to the first drive unit, a second charge-pump circuit configured to apply a second output voltage to the second drive unit, and an operation control unit configured to control an operation of the first charge-pump circuit and an operation of the second charge-pump circuit, and the operation control unit is configured to determine a timing at which the first charge-pump circuit is to apply the first output voltage and a timing at which the second charge-pump circuit is to apply the second output voltage, based on the first voltage, the second voltage, and the state of the first conversion operation or the second conversion operation.

7. The DC-DC converter according to claim 1, wherein the charge-pump circuit unit includes a charge-pump circuit configured to perform a first operation for applying a first output voltage to the first drive unit and a second operation for applying a second output voltage to the second drive unit, and an operation control unit configured to control the first operation and the second operation of the charge-pump circuit, and the operation control unit is configured to determine a timing of the first operation and a timing of the second operation based on the first voltage, the second voltage, and the state of the first conversion operation or the second conversion operation.

\* \* \* \* \*